United States Patent [19]

Enomoto

[11] Patent Number: 4,681,409
[45] Date of Patent: Jul. 21, 1987

[54] OUTSIDE REAR VIEW MIRROR

[75] Inventor: Masao Enomoto, Hatano, Japan

[73] Assignee: Ichikoh Industries, Ltd., Tokyo, Japan

[21] Appl. No.: 681,655

[22] Filed: Dec. 14, 1984

[30] Foreign Application Priority Data

| Dec. 17, 1983 | [JP] | Japan | 58-237187 |
| Dec. 17, 1983 | [JP] | Japan | 58-237188 |
| Apr. 13, 1984 | [JP] | Japan | 59-53491[U] |
| Jun. 15, 1984 | [JP] | Japan | 59-89215[U] |

[51] Int. Cl.⁴ .......................... G02B 5/08; G02B 7/18; B60R 1/06
[52] U.S. Cl. .................... 350/637; 350/604; 248/478; 248/900
[58] Field of Search ............... 350/637, 604; 248/549, 248/478, 477, 900

[56] References Cited

U.S. PATENT DOCUMENTS

| 2,877,686 | 3/1959 | Foster | 88/98 |
| 3,005,384 | 10/1961 | Baird et al. | 88/98 |
| 3,339,876 | 9/1967 | Kampa | 248/478 |
| 3,610,736 | 10/1971 | Bateman | 350/289 |
| 3,830,561 | 8/1974 | LeFave et al. | 350/637 |
| 4,125,244 | 11/1978 | Lukey | 248/478 |
| 4,186,905 | 2/1980 | Brudy | 248/478 |
| 4,456,333 | 6/1984 | Hewitt | 350/637 |
| 4,504,116 | 3/1985 | Sharp | 350/637 |

FOREIGN PATENT DOCUMENTS 2129234 10/1972 France .
2378654 8/1978 France .

Primary Examiner—Jon W. Henry
Attorney, Agent, or Firm—Schwartz, Jeffery, Schwaab, Mack, Blumenthal & Evans

[57] ABSTRACT

An outside rear view mirror for cars wherein a mirror housing which is formed independently of a base is swingably supported by the base through a speindle member and automatically swung toward the car body by remote operation in the car room, and wherein when load is forcedly added to the mirror housing from outside, the mirror housing is swung toward the car body by a buffer mechanism, which is arranged between the base and the mirror housing, to thereby absorb the impact of the load added.

20 Claims, 38 Drawing Figures

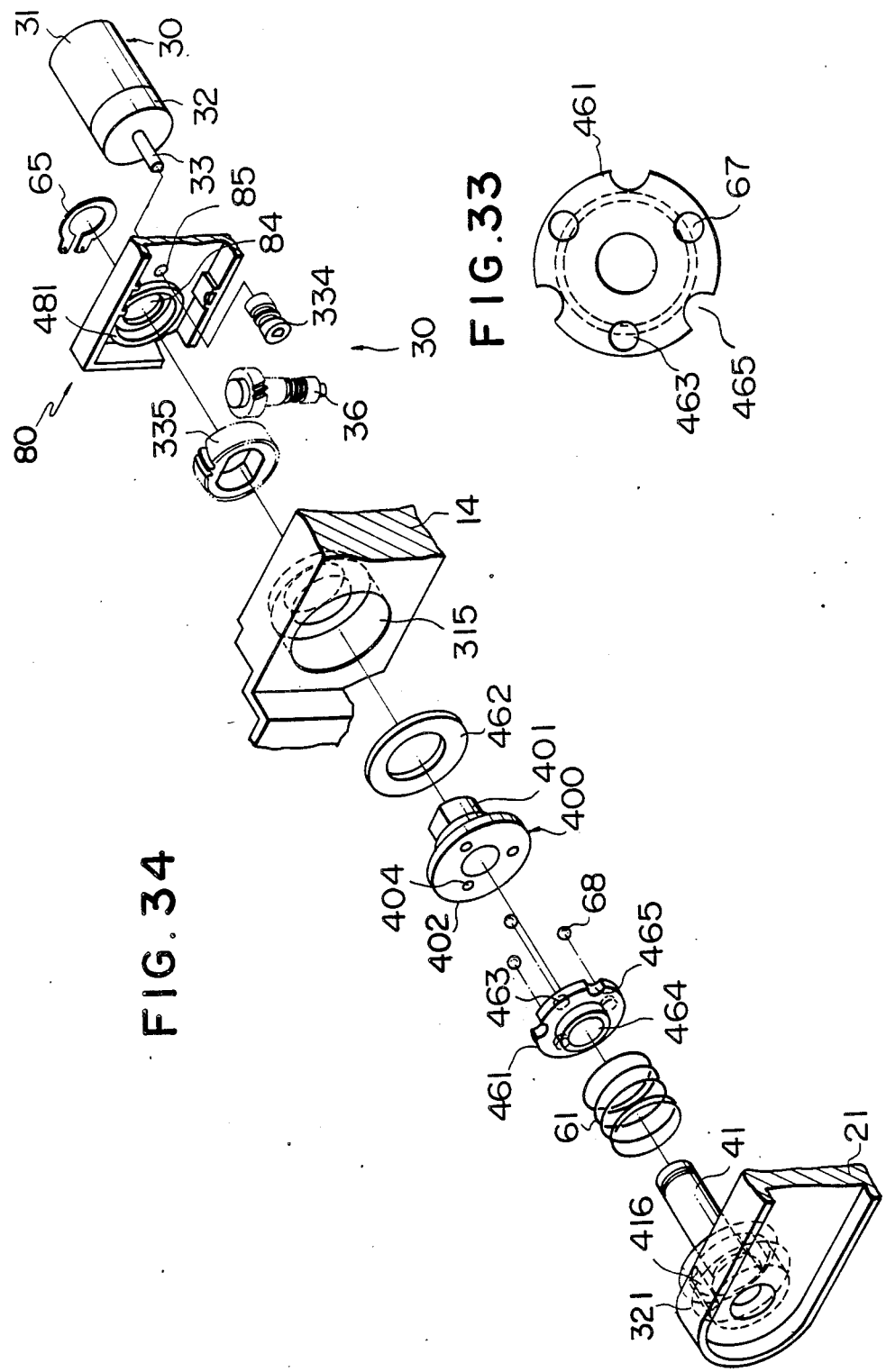

OUTSIDE REAR VIEW MIRROR

BACKGROUND OF THE INVENTION (a) Field of the Invention

The present invention relates to an outside rear view mirror for cars provided with a drive transmitting mechanism for electrically swinging its mirror housing relative to the base.

(b) Prior Art

The outside rear view mirrors have been widely used for cars and one of them is disclosed by U.S. Pat. No. 4,213,675. FIGS. 1 and 2 of this patent show the conventional outside rear view mirror, in which FIG. 1 is a vertically-sectioned view thereof and FIG. 2 a partially-sectioned view thereof.

As shown in FIGS. 1 and 2, the mirror housing (3) is swingably attached to the body (6) by means of a plate-like arm (17) and a screw (15) in the case of this conventional outside rear view mirror (4).

The plate-like arm (17) is engaged with the boss of the mirror housing (3) by means of plural projections. The mirror housing (3), plate-like arm (17) and body (7) are held, pressed against one another, by a spring (38).

In the case of this conventional outside rear view mirror (4), the mirror housing (3) is displaced forward or backward, taking the screw (15) as its center, when the handle (21) is moved forward or backward in FIG. 1. When the handle (21) is rotated, taking the center axis of the plate-like arm (17) as its center, the mirror housing (3) is displaced up and down.

When excessive load is added to the mirror housing (3), the mirror housing (3) is released from the plate-like arm (17) and swung toward the door (2).

The above-described conventional outside rear view mirror (4) is most suitable for use as a device whose range of vision can be adjusted by the handle (21).

As apparent from FIGS. 1 and 2, however, forward or backward displacement of the mirror housing (3) is determined by the amount of handle (21) operation carried out in the car room. This amount of handle (21) operation is limited to a range necessary to adJust the field of vision allowed by the mirror (4). When it is wanted that the mirror housing (3) which is projected outside the car body is swung over the range of adjusting the field of vision and displaced to contact with the car body at the time of transporting or garaging the car, the mirror housing must be forcedly swung against the spring (38) and released from the boss projections (16). Namely, the mirror housing must be brought under such state that impact has been artificially added to the mirror housing (3).

It was therefore needed that the swing operation was carried out outside the car body. In addition, the swing operation was considerably difficult because it must be carried out against the spring which was pressed against the mirror housing (3) and body (7).

SUMMARY OF THE INVENTION

The object of the present invention is to provide and outside rear view mirror which can be remotely operated in the car room to swing the mirror housing relative to the base and displace it toward the car body.

The object of the present invention can be achieved by an outside rear view mirror comprising a base to which a mirror housing, which adjustably holds a mirror, is swingably attached through a spindle member, a drive transmitting mechanism for remotely operating the mirror housing to automatically swing it in relation to the base, and a buffer mechanism arranged between the mirror housing and the base.

BRIEF DESCRIPTION OF THE DRAWINGS

FIG. 1 is a vertically-sectioned view showing the mirror attached to the door of a car.

FIG. 2 is a horizontally-sectioned view showing an adjustment means used for the mirror in FIG. 1.

FIG. 4 is a front view showing the outside rear view mirror partially sectioned.

FIG. 5 is a view partially sectioned along the line A—A in FIG. 4.

FIG. 6 is a view taken along the line B—B in FIG. 5.

FIG. 7 is an exploded view showing main parts of the mirror.

FIG. 8 is a view similar to FIG. 5 and showing a mirror housing automatically swung.

FIG. 9 is a view similar to FIG. 5 and showing the mirror housing forcedly swung backward as the result of its being impacted from front.

FIG. 10 is a view similar to FIG. 5 and showing the mirror housing forcedly swung forward as the result of its being impacted from back.

FIG. 11 is a front view showing a spindle member.

FIG. 12 is a view showing a part of the spindle member sectioned horizontally.

FIG. 13 shows the spindle member viewed in the direction of an arrow A in FIG. 11.

FIG. 14 shows the spindle member viewed in the direction of an arrow B in FIG. 10.

FIG. 15 is a plan showing the main portion of a base.

FIG. 16 is a sectional view taken along a line C—C in FIG. 15.

FIG. 17 is a sectional view taken along a line D—D in FIG. 15.

FIG. 18 is a plan similar to FIG. 5.

FIG. 19 is an enlarged sectional view similar to FIG. 6.

FIG. 20 is an exploded view showing main parts of mirror.

FIG. 21 is a view similar to FIG. 8.

FIG. 22 is a view similar to FIG. 9.

FIG. 23 is a view similar to FIG. 10.

FIG. 24 is a front view showing an outside rear view mirror partially sectioned.

FIG. 25 is a sectional view taken along the line E—E in FIG. 25.

FIG. 26 is an enlarged sectional view taken along the line F—F in FIG. 25.

FIG. 27 is an exploded view showing the main parts of the mirror.

FIG. 28 is a view similar to FIG. 8.

FIG. 29 is a view similar to FIG. 9.

FIGS. 30 through 38 show a fourth embodiment of the present invention.

FIG. 30 is a front view showing an outside rear view mirror partially sectioned.

FIG. 31 is a sectional view taken along the line G—G in FIG. 30.

FIG. 32 is an enlarged sectional view taken along the line H—H in FIG. 31.

FIG. 33 is a plan showing a bush.

FIG. 34 is an exploded view showing the main parts of the mirror.

FIG. 35 is a view similar to FIG. 31 and showing the mirror housing automatically swung backward.

FIG. 36 is a view similar to FIG. 31, showing the mirror housing automatically swung forward.

FIG. 37 is a view similar to FIG. 9.

FIG. 38 is a view similar to FIG. 10.

DETAILED DESCRIPTION OF THE PREFERRED EMBODIMENTS

FIGS. 3 through 17 show a first embodiment of the present invention.

Figure 1:
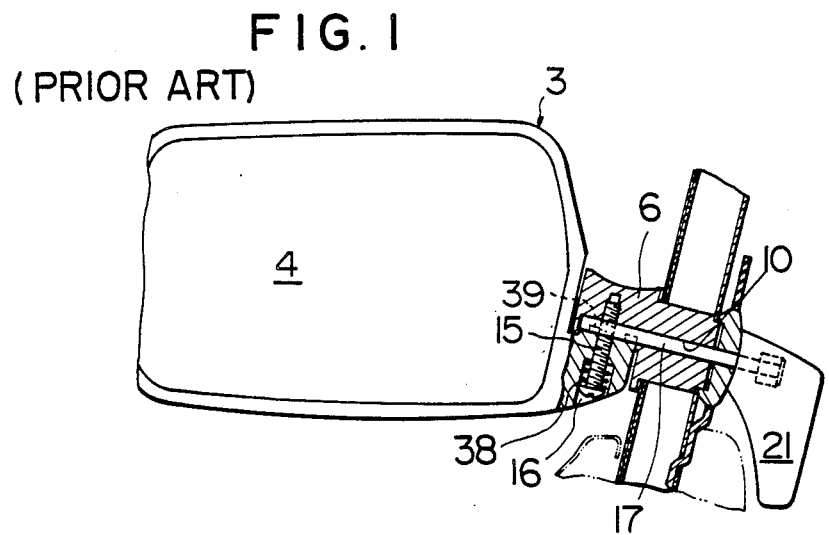
FIGS. 1 and 2 shows one of the conventional outside rear view mirrors.
Figure 2:
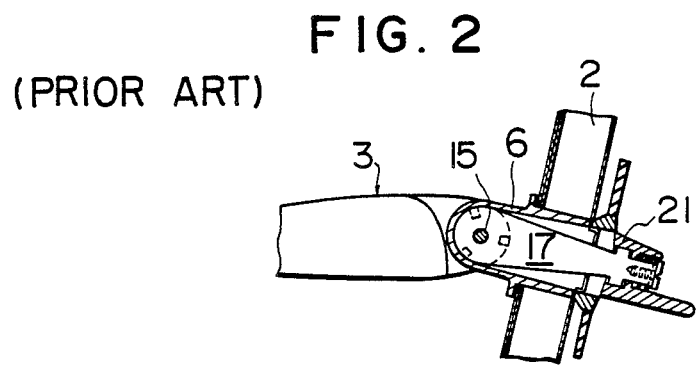
Figure 3:
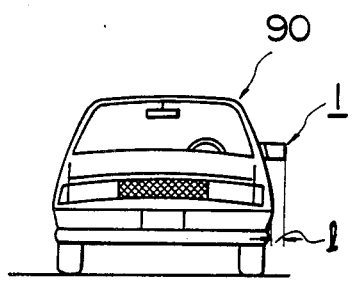
FIGS. 3 through 17 show an embodiment of the present invention in which an outside rear view mirror is attached to the car.

As shown in detail in FIGS. 3 through 17, an outside rear view mirror 1 comprises a mirror housing 10 for adjustably holding a mirror 50 in the opening thereof, a base 20 to which the mirror housing 10 is swingably attached through a spindle member 40, a drive transmitting mechanism 30 for swinging the mirror housing 10 relative to the base 20, and a buffer mechanism 60 located between the mirror housing 10 and the spindle member. As shown in FIG. 3, the outside rear view mirror 1 is attached to a car body 90 in such a way that it is projected only by distance l outside the car body 90.

Figure 4:
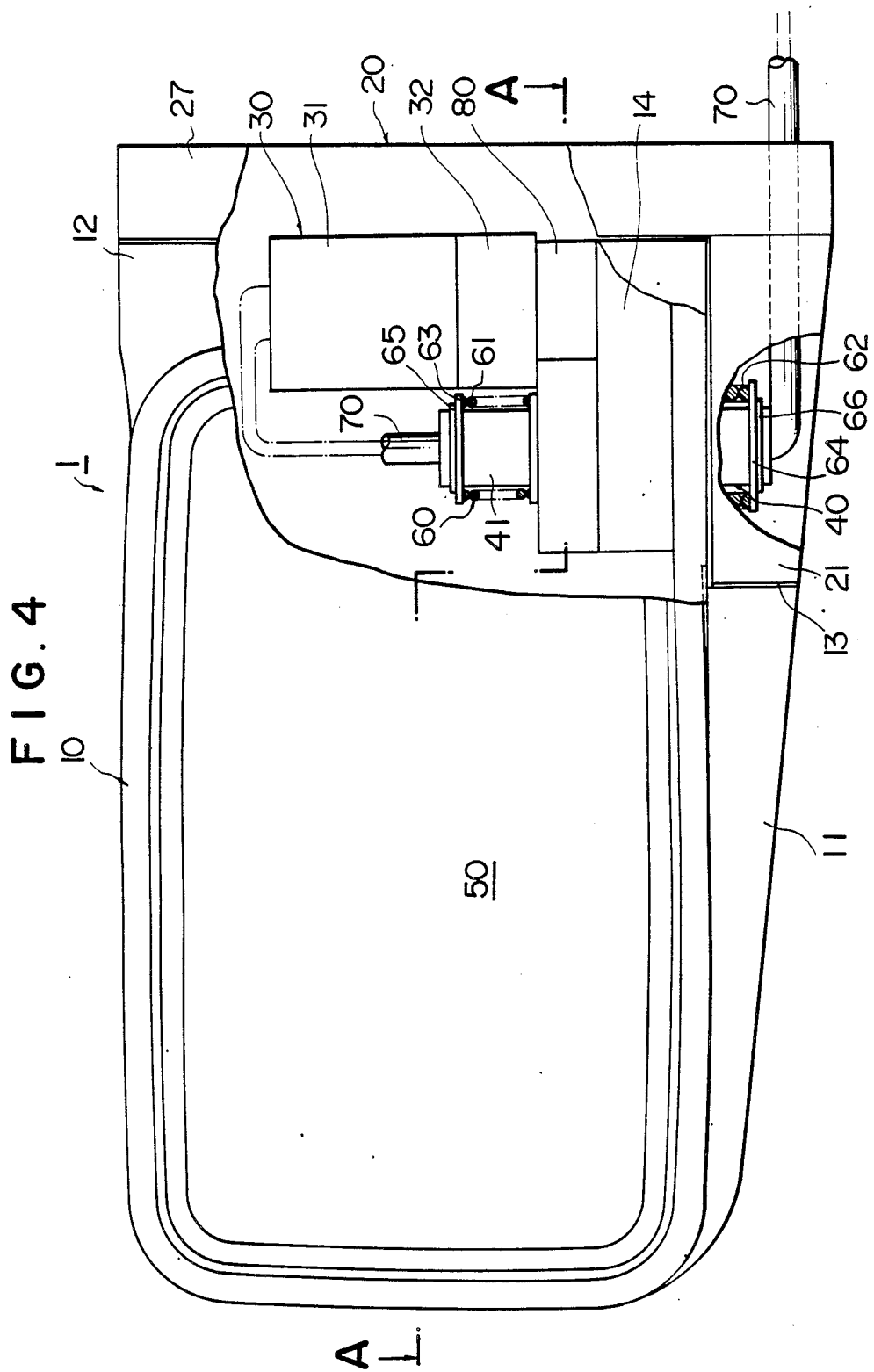
Figure 5:
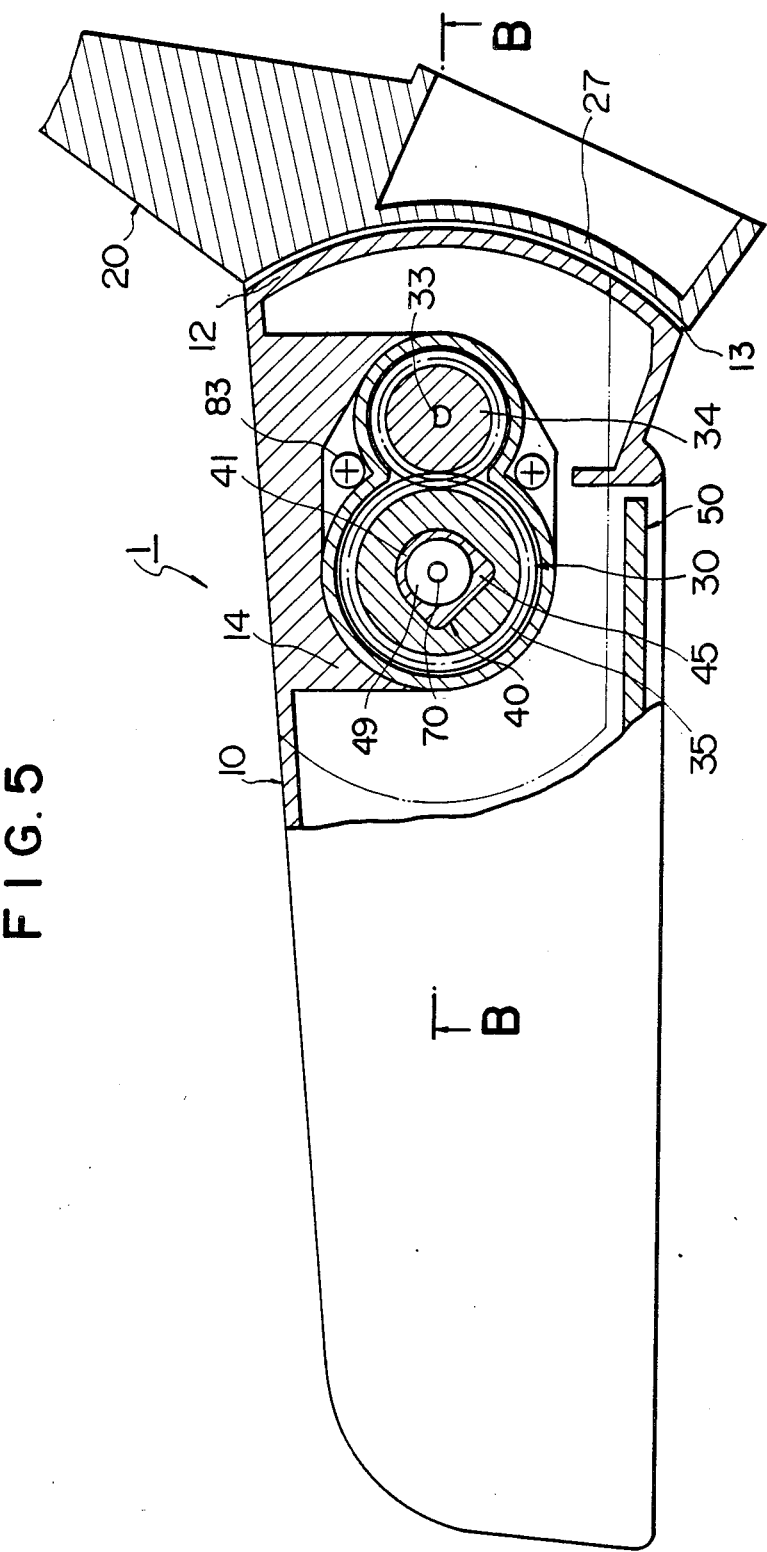

As shown in FIGS. 4 and 5, the mirror housing 10 is of the rectangular type, having longer horizontal sides, and formed different from the base 20. The mirror 50 is held in the opening of the mirror housing 10 to adjust the field of vision.

The mirror housing 10 is swingably supported by the base 20 through the spindle member, and a buffer mechanism 60 which comprises springs 61 and 62 arranged between the mirror housing 10 and the base 20 and between the base 20 and the spindle member 40, respectively, serves to buffer such impact that is larger than a certain load. This impact buffering can be attained in such a way that the mirror housing 10 and spindle member 40 are swung round the base 20 against the springs 61 and 62 when the impact is added from outside to the mirror housing 10 of the outside rear view mirror which comprises the mirror housing 10, base 20 and spindle member 40 urged by the springs 61 and 62. The mirror housing 10 is swung round the spindle member 40 by remotely operating the drive transmitting mechanism 30 in the car room except the case where it is forcedly swung by the strong impact as described above.

Figure 6:
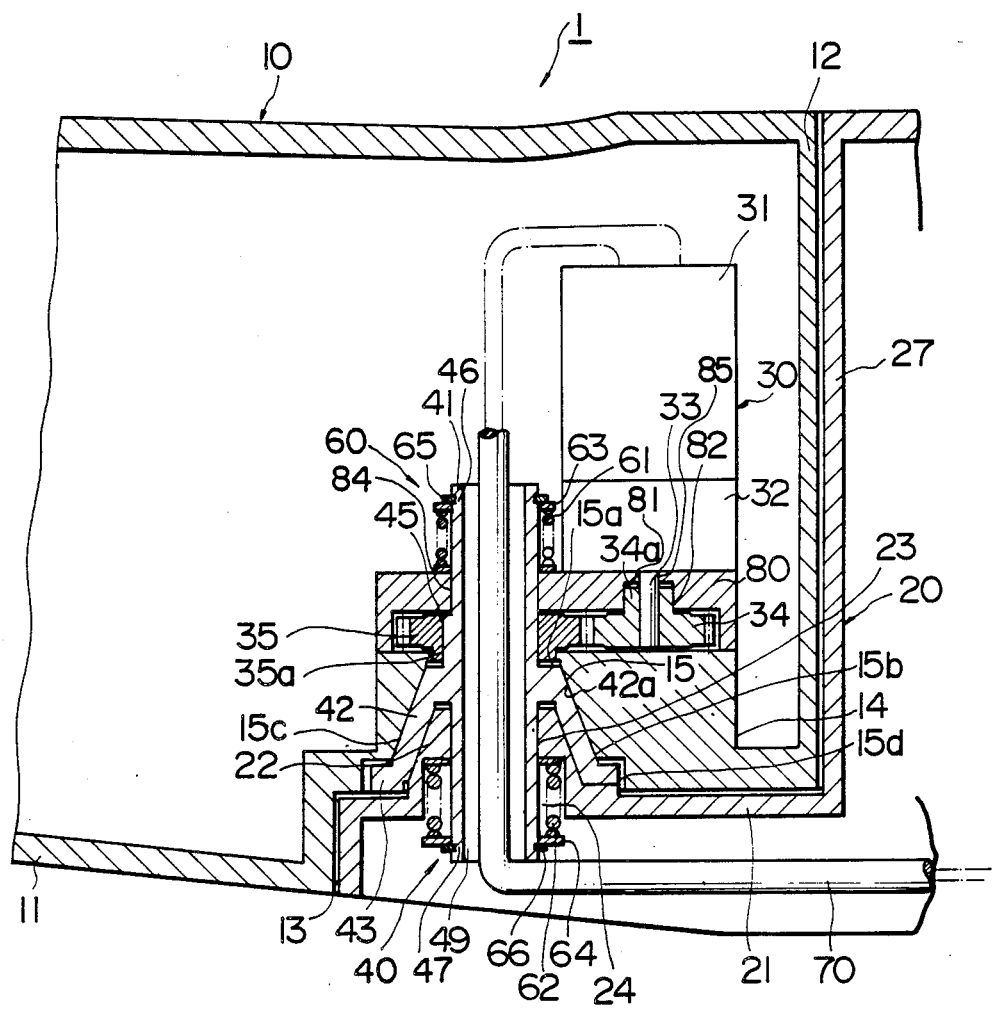
Figure 7:
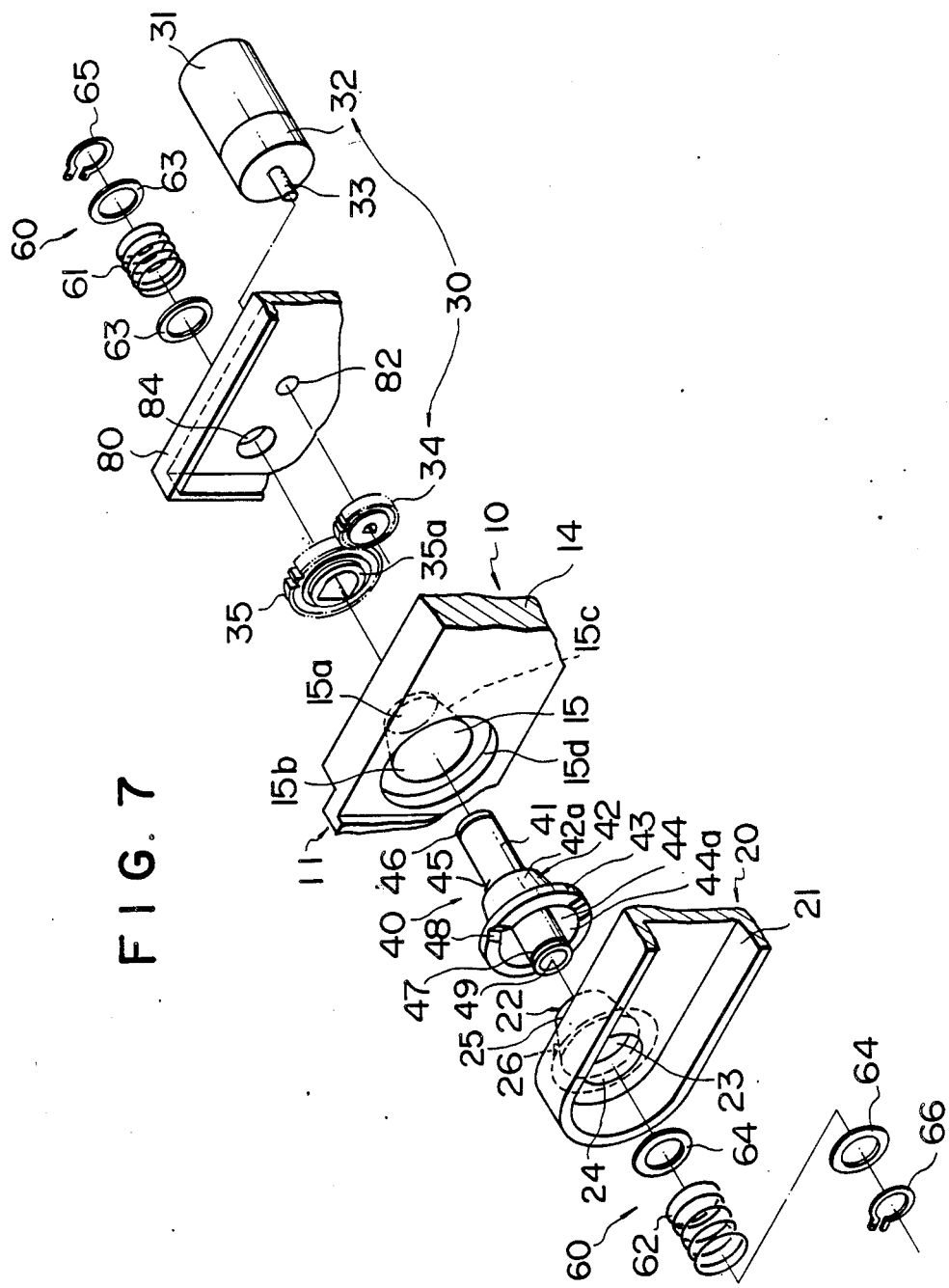

As shown in FIGS. 6 and 7, to describe the arrangement of the mirror housing 10 in more detail, a base attaching portion 13 which is recessed inward a bottom wall 11 of the mirror housing 10 is formed at that portion of the bottom wall 11 of the mirror housing 10 which is located on the side of the base 20. A side wall 12 of the mirror housing 10 is arranged to have a curve portion. A mount 14 is projected from the base attaching portion 13 inward the mirror housing 10. The spindle member 40 passes through a through-hole 15 which is formed in the mount 14. The mount 14 includes a tapered circumference 15c, having an upper small-diameter portion 15a and a lower large diameter portion 15b, and a ring-shaped recess 15d around the large diameter portion 15b.

The base 20 has a vertical wall 27 provided with a curve portion which corresponds to the side wall 12 of the mirror housing 10, and a support 21 which extends horizontally from the vertical wall 27 toward the mirror housing 10.

Figure 15:
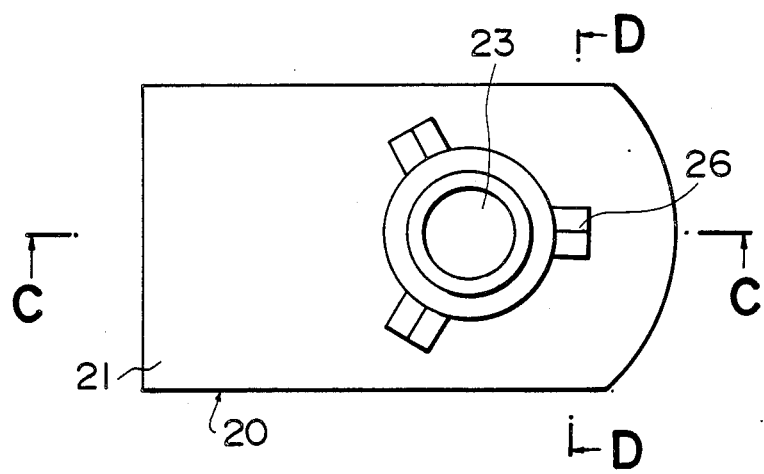
Figure 16:
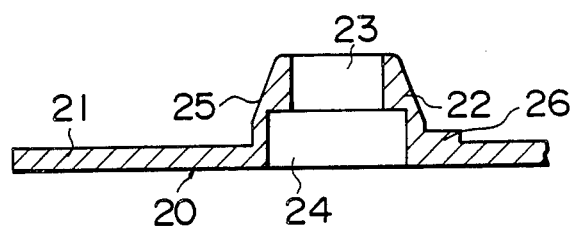
Figure 17:
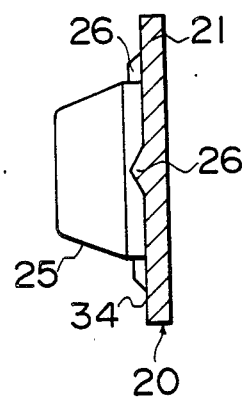

As shown in FIG. 15 to 17, a conical bearing 22 is projected from the support 21. A spring attaching portion 24 is formed on the underside of the bearing 22 and a through-hole 23 through which a cylindrical shaft 41 of the spindle member 40 passes is formed in the bearing 22, extending from the bottom of the spring attaching portion 24 to the upper side of the bearing 22. Three projections 26 are formed on the circumference of the bearing 22 of the base 20, each separated from the others at an angle of 120°.

As shown in FIGS. 11 through 14, the spindle member 40 includes a cylindrical shaft 41 and a conical ring-shaped wall 42 which is enlarged downward and which is integrally formed at the center portion of the cylindrical shaft 41. A ring-shaped recess 44 whose outer wall is tapered or enlarged downward is formed between the cylindrical shaft 41 and the conical ring-shaped wall 42. Engagement recesses 48 are formed, each separated from the others at an angle of 120°, on the lower end face of the ring-shaped wall 42. These engagement recesses 48 are engaged with the projections 26 on the base 20. A spur gear attaching portion 45 is formed on the cylindrical shaft 41 and a spur gear 35 located on the fixed side of the transmitting mechanism 30 is attached is formed on the cylindrical shaft 41. The spur gear attaching portion 45 has a D-shaped section and located adjacent of the top of the ring-shaped wall 42. Formed on the upper and lower ends of the cylindrical shaft 41 are recesses 46 and 47 into which clips 65 and 66 are fitted to hold the springs 61 and 62 of the buffer mechanism 60.

A cord 70 which is connected to a drive motor 31 for the drive transmitting mechanism 30 is inserted through a hollow portion 49 of the cylindrical shaft 41.

The drive transmitting mechanism 30 comprises the spur gear 35 which is located on the fixed side and which is fixed to the portion 45 of the cylindrical shaft 41, another spur gear 34 which is engaged with the spur gear 35, fixed to a motor shaft 33 of the drive motor 31, and located on the movable side, the drive motor for rotating the spur gear 34, and a speed reducer 32.

The buffer mechanism 60 comprises the spring 61 which is compressed between the engagement recess 46 located on the upper end side of the cylindrical shaft 41 and the upper face of a cover 80 by means of two washers 63 and a clip 65, and the spring 62 which is compressed in the spring attaching portion 24 of the base 20 by means of the clip 66 and two washers 64, said clip 66 being fitted into the engagement recess 47 located on the lower end side of the cylindrical shaft 41. The cover 80 serves to seal the two spur gears 34 and 35 of the drive transmitting mechanism 30, and includes a through-hole 84 for the cylindrical shaft 41, a through-hole 85 for the motor shaft 31, and a bearing 82 for the spur gear 34.

The mirror housing, base, spindle member drive transmitting mechanism and cover are assembled as follows.

The spindle member 40 is attached to the bearing 22 projected from the support 21 of the base 20. The cylindrical shaft 41 of the spindle member 40 is passed through the through-hole 23 in the bearing 22 of the base 20 and the spring attaching portion 24 and projected below the base 20 under this state. Tapered ring-shaped recess 44 between the cylindrical shaft 41 of the spindle member 40 and the ring-shaped wall 42 is fitted onto the bearing 22 and their tapered faces are contacted each other. The engagement recesses 48 on the bottom face of the flange 43 of the ring-shaped wall 42 are fitted onto the projections 26 on the circumference of the bearing 22 at the support 21 of the base 20 to thereby set the spindle member 40 at a desired position.

The mirror housing 10 is then attached to the spindle member 40 which has been set to the base 20. The through-hole 15 in the mount 14 of the mirror housing 10 is fitted onto the ring-shaped wall 42 of the spindle member 40 under this state. At this time, both of the ring-shaped wall 42 and through-hole 15 are contacted with each other and the upper end portion of the cylindrical shaft 41 is projected inward the mirror housing 10.

Fitted onto the spur gear attaching portion 45 of the cylindrical shaft 41 which is projected from the mount 14 of the mirror housing 10 is the spur gear 35 located on the fixed side. At this time, a shaft 35a of the spur gear 35 is fitted into the through-hole 15 and both of the spur gear 35 and spur gear attaching portion 45 of the cylindrical shaft 1 are fitted each other not to rotate relative to the other. The spur gear 34 located on the movable side is set on the mount 14 to engage the spur gear 35 and these are sealed by the cover 80. The cylindrical shaft 41 is projected through the through-hole 84 in the cover inward the mirror housing 10, and the motor shaft 33 of the drive motor 31 on the top of the cover 80 is passed through the through-hole 85, with the speed reducer 32 interposed, into the hollow portion 81 in the cover 80 to fit into the spur gear 34. A shaft 34a of this spur gear 34 is supported by the bearing 82 of the cover 80. The cover 80 is fixed on the mount 14 by means of a screw 83 (See FIG. 5).

The drive motor 31 and speed reducer 32 are attached to the top of the cover 80, and the cord 70 is introduced outside through the hollow portion 49 in the cylindrical shaft 41.

The buffer mechanism 60 is attached to the assembly thus obtained. More specifically, the spring 61 which is interposed between the two washers 63 is fitted onto the cylindrical shaft 41 projected from the top of the cover 80 and compressed and fixed by the clip 65 fitted onto the engagement recess 46. The spring 62 which is interposed between the two washers 64 is similarly attached to the lower end of the cylindrical shaft 41 projected at the spring attaching portion 24 of the base 20 and it is compressed and fixed by the clip 66 fitted onto the engagement recess 47. Therefore, the tapered faces 25, 44a, 42a and 15c of the bearing 22 of the base 20, of the ring-shaped wall 42 of the spindle member 40, of the ring-shaped wall 42, and of the through-hole 15 in the mount 14 of the mirror housing 10 are forcedly contacted with one another by the springs 61 and 62, thereby causing the projections 26 to be forcedly engaged with the engagement recesses 48.

Figure 8:
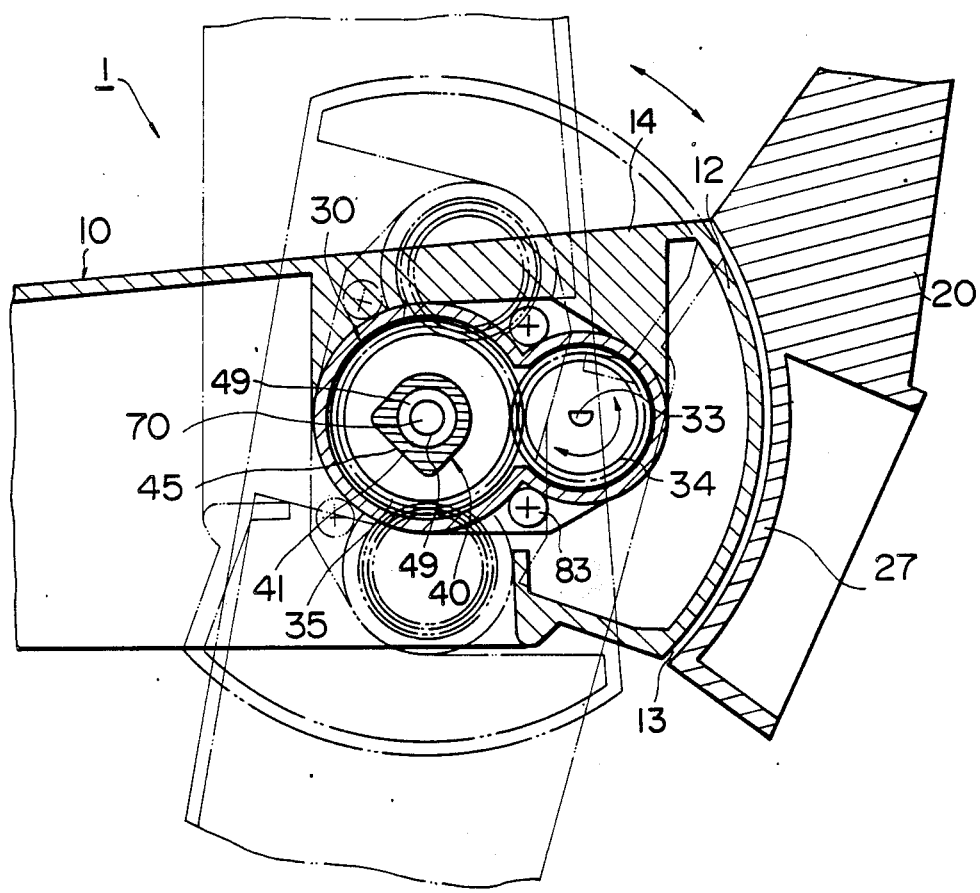

It will now be described how the mirror housing 10 is swung by remote operation, referring to FIG. 8.

In a case where the mirror housing 10 is swung backward, for example, the drive motor 31 is rotated and its rotation is transmitted to the spur gear 34 through the speed reducer 32. Since the spur gear 34 is engaged with the spur gear 35 located on the fixed side, the rotation is transmitted in a direction in which the spur gear 34 is rotated. However, the spur gear 35 located on the fixed side is unswingably attached to the cylindrical shaft 41 of the spindle member 40 and this spindle member 40 is limited in its swinging movement by the two springs 61 and 62 of the buffer mechanism 60 and by the engagement between the projections 26 and the engagement recesses 48 in such a way that it is not swung by any load smaller than the certain load. Therefore, the spur gear 35 is fixed and the other spur gear 34 moves around the spur gear 35 and on its axis. The mirror housing 10 which fixes the spur gear 34 thus moves round the cylindrical shaft 41 and slides on the tapered face 44a of the spindle member 40 to swing backward.

In a case where the mirror housing 10 is swung forward, the drive motor 31 is reversly rotated to rotate in the opposite direction the spur gear 34.

Figure 9:
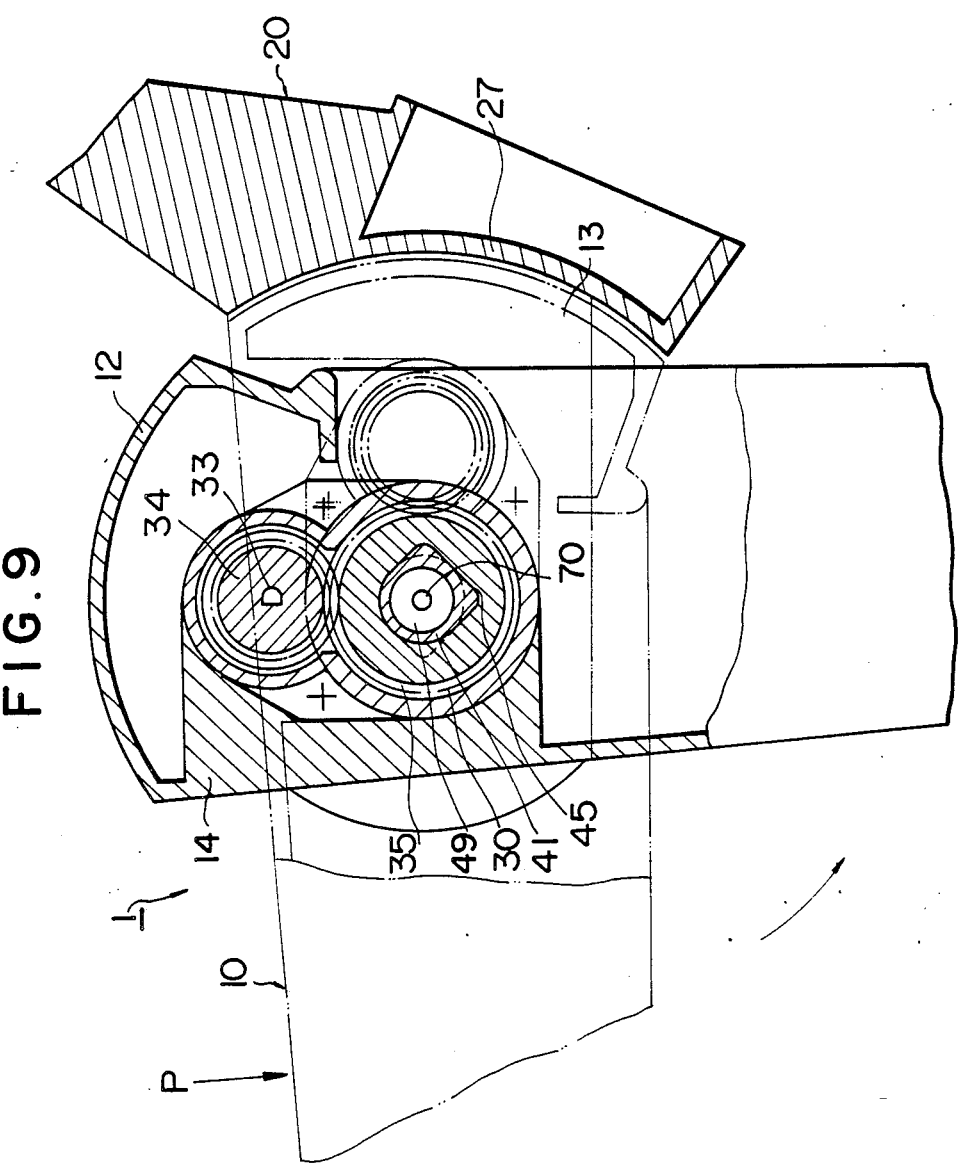
Figure 10:
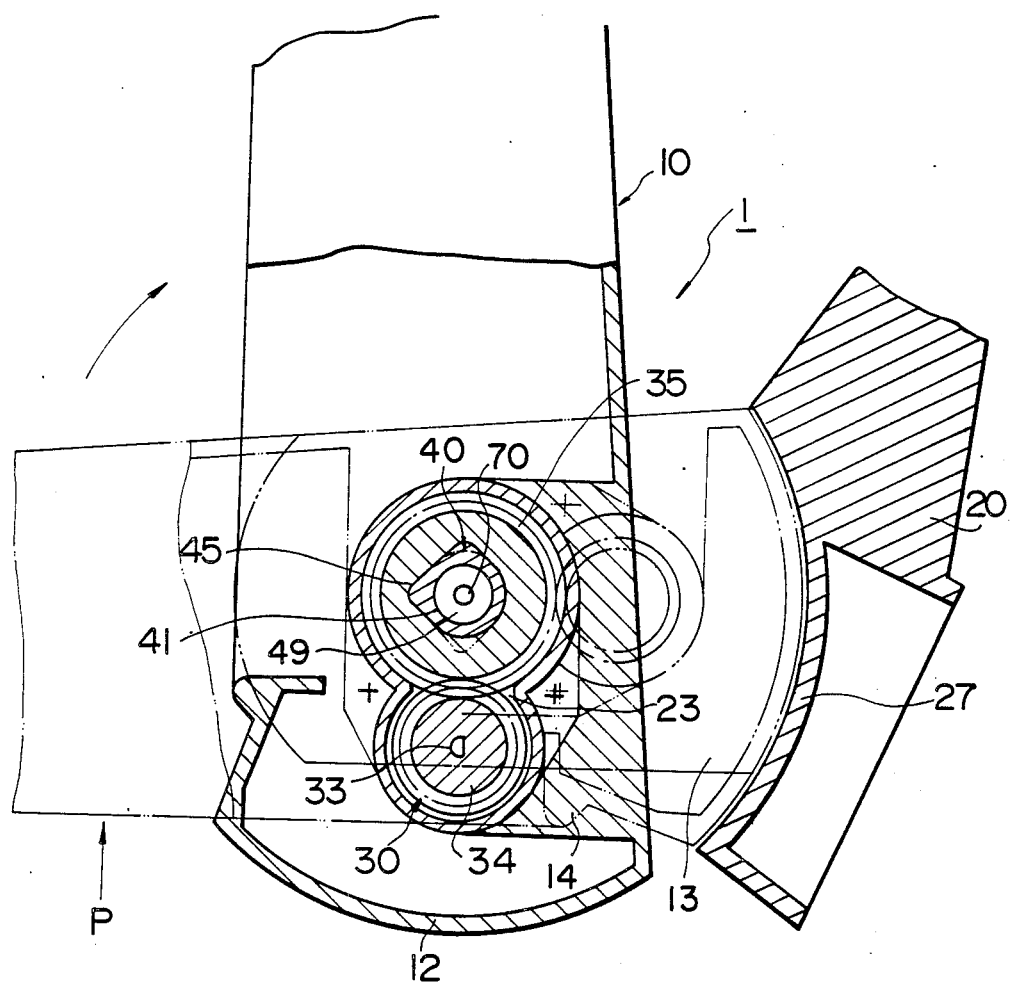
Figure 11:
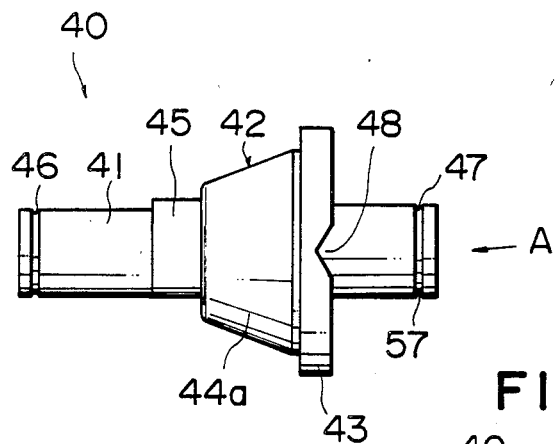
Figure 12:
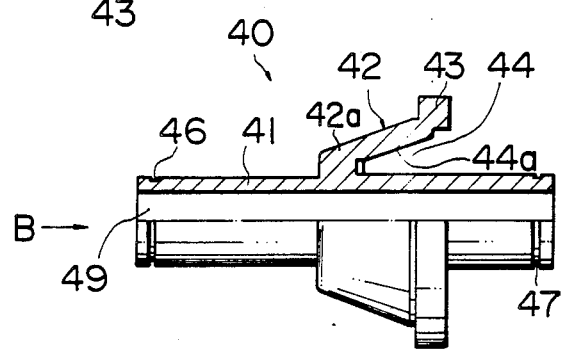
Figure 13:
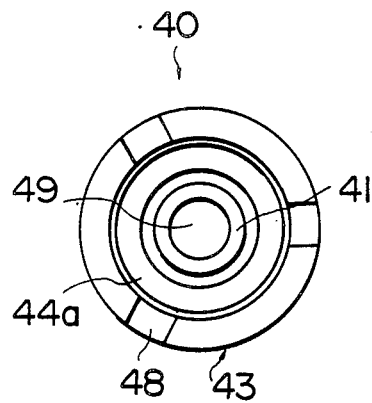
Figure 14:
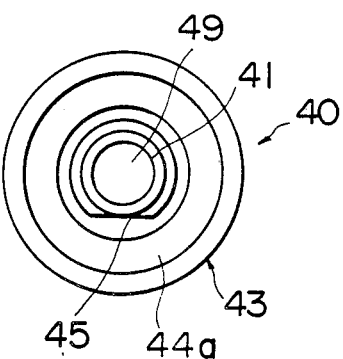

Referring to FIGS. 9 and 10, it will be described how the impact exerted by external force P is buffered when the mirror housing 10 is forcedly swung by the external force P added thereto.

FIG. 9 shows a case where the mirror housing 10 is swung backward by the external force P added thereto from front.

When the external force P is added to the mirror housing 10, the two spur gears 34 and 35 become locked and both of the mirror housing 10 and spindle member 40 become unswingable. Therefore, rotating force caused by the external force P serves to make the mirror housing 10 and spindle member 40 cooperative to each other. When this rotating force exceeds the engagement force between the engagement recesses 48 of the spindle member 40 and the projections 26 on the base 20 and the compressing force of the two springs 61 and 62, the mirror housing 10 is slid and swung together with the spindle member 40 on the tapered face 25 of the bearing 22 in relation to the base 20, thereby enabling the impact of the external force P to be buffered by their swinging movement.

FIG. 10 shows a case where the mirror housing 10 is swung forward by the external force P added thereto from back. As described above referring to FIG. 9, the mirror housing 10 and spindle member 40 are simultaneously slid and swung forward on the tapered face of the bearing 22 of the base 20, thereby buffering the impact of the external force P.

When arranged as described above, the mirror housing can be easily swung by remote operation in the car room to become parallel to the outside of the car body at the time of transporting the car to which the outside rear view mirrors are attached or garaging it, thereby enabling car transportation space to be made smaller and preventing the mirror housings from becoming obstacles at the time of garaging the car.

Further, the buffer mechanism is arranged between the mirror housing and the base. Therefore, the mirror housing is swung to buffer impact even when the impact is added to the mirror housing, thereby preventing or reducing injury to human beings and the outside rear view mirror 1.

Furthermore, the mirror housing 10, base 20 and spindle member 40 are slidably contacted with one another at their conical tapered faces. Therefore, the outside rear view mirror 1 is excellent in stability such that the field of vision is substantially unaffected by vibration of the mirror 50.

FIGS. 18 through 23 show a second embodiment of the present invention, which is fundamentally similar to the first embodiment.

Since the mirror housing, base, cover and buffer mechanism are almost same as those in the first embodiment, they are represented by same reference numerals, but parts which are different from those in the first embodiment will be denoted by different reference numerals and described below.

Figure 20:
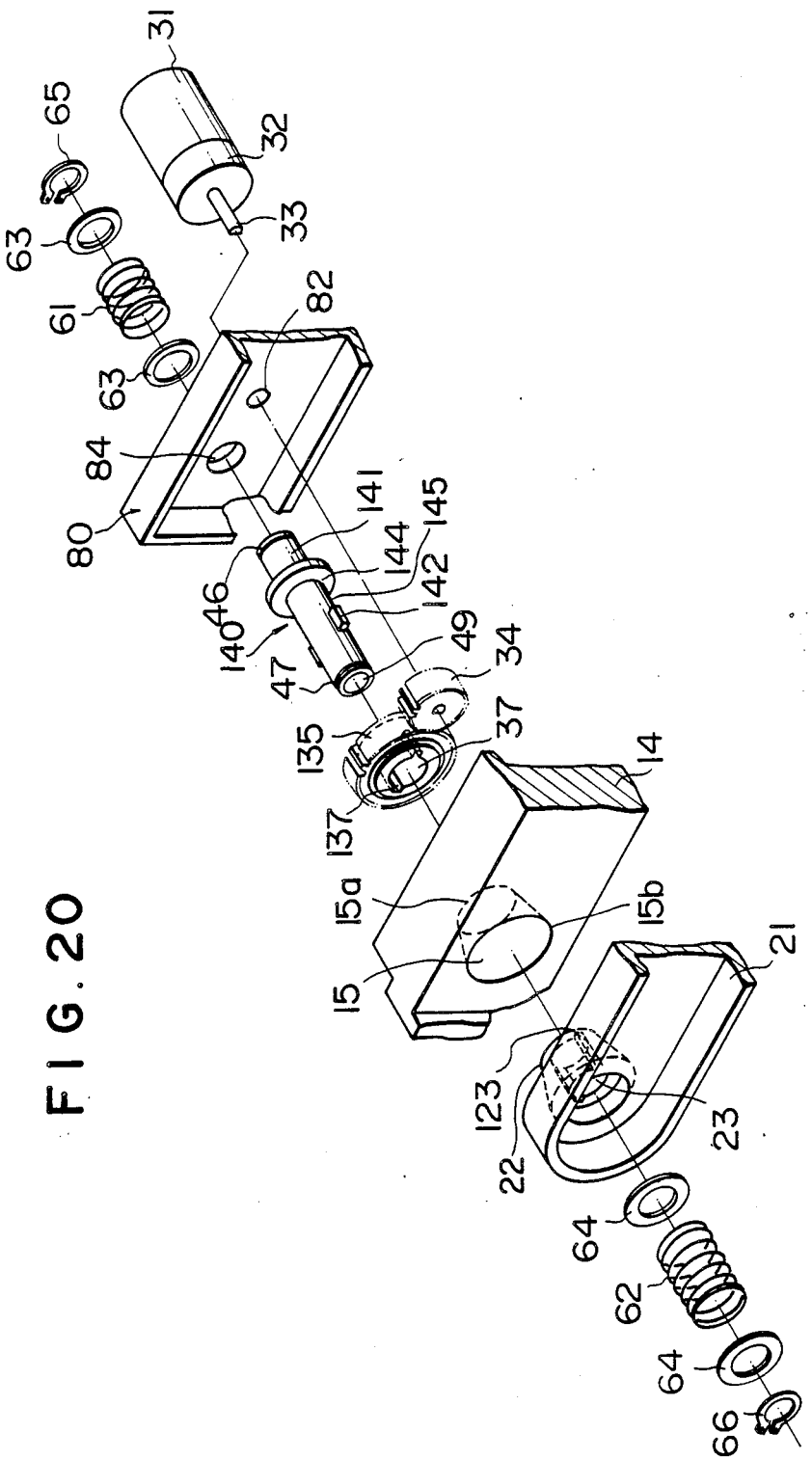

As shown in FIG. 20, the through-hole 23 in the bearing 22 of the base 20 is provided with a pair of key grooves 123.

The spindle member 140 has a cylindrical shaft 141. Two projection 142 and a conical slide-contact wall 144 spaced therefrom are formed integrally to the cylindrical shaft 141. Between the projections 142 and the conical slide-contact wall 144 is a spur gear attaching portion 145 for attaching a spur gear 135. The conical slide-contact wall 144 is enlarged upward and the spur gear 135 is located on the fixed side.

The drive transmitting mechanism 30 is substantially the same in arrangement as in the first embodiment, but a tapered recess 36 is formed on the upper portion of the through-hole 37, of the spur gear 135 located on the fixed side. Further, a pair of grooves 137 are formed on the inner wall of the through-hole 37. The projections 142 on the cylindrical shaft 141 are passed through the grooves 137, respectively.

Figure 18:
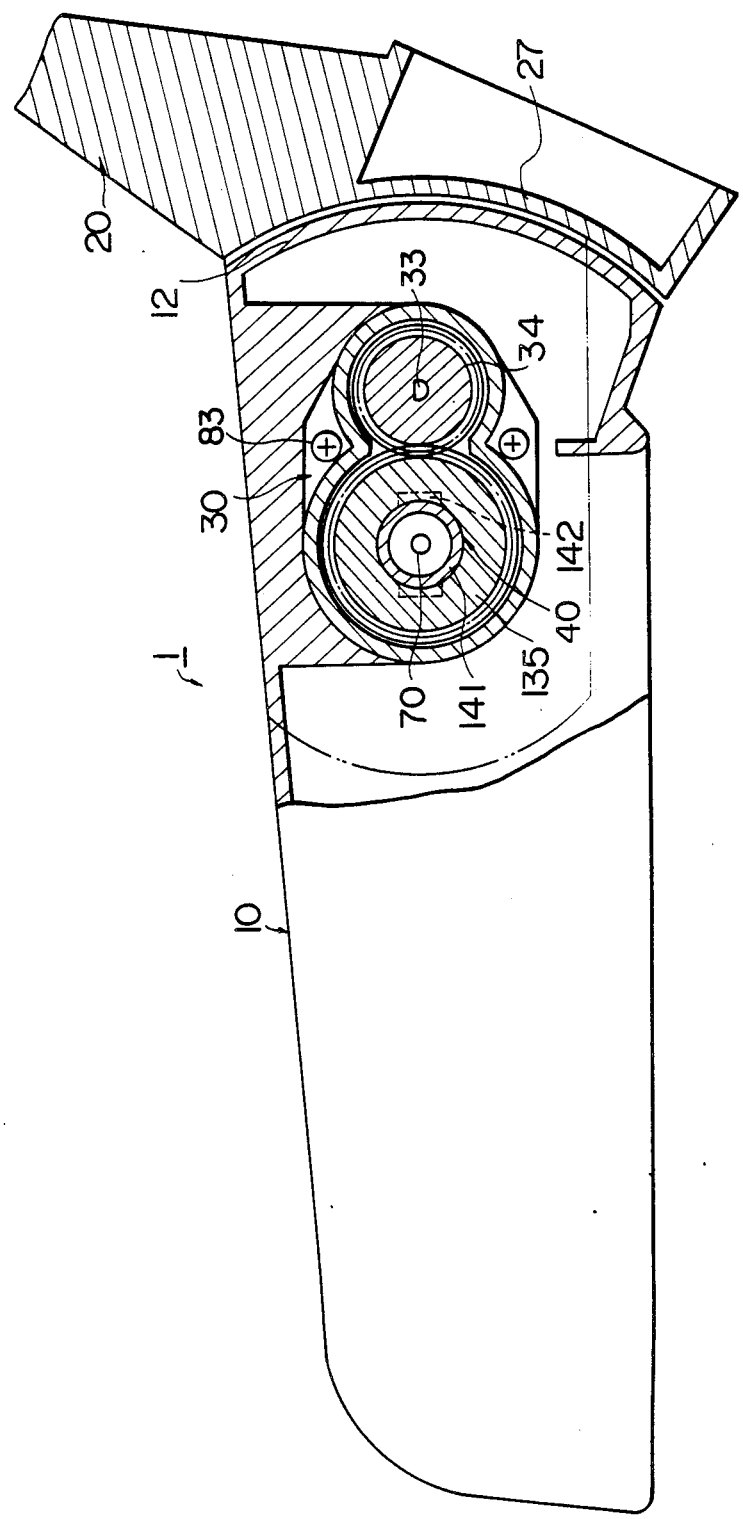
FIGS. 18 through 23 show a second embodiment of the present invention.
Figure 19:
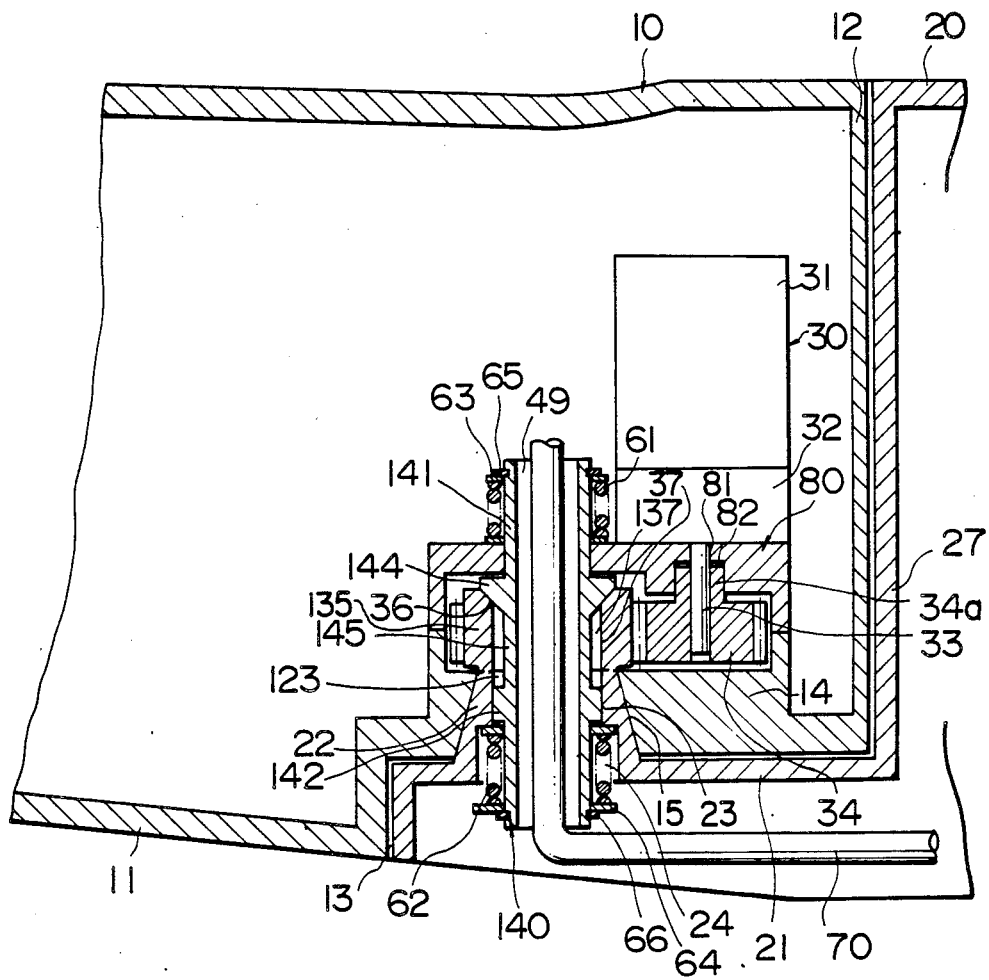

As shown in FIGS. 18 and 19, base, mirror housing, spindle member and drive transmitting mechanism are assembled as follows.

The through hole 15 of the mirror housing 10 is fitted onto the bearing 22 of the base 20 to locate the mirror housing 10 on the base 20, the spur gear 135 is positioned on bearing 22, and the cylindrical shaft 141 of the spindle member 40 is then inserted into the assembly from above. The projections 142 on the cylindrical shaft 141 are passed through the paired grooves 137 which are formed on the inner face of through-hole 37 of the spur gear 135 located on the fixed side, and they are fitted, movable up and down, into the key grooves in the bearing 22 of the base 20. The spur gear 34 located on the movable side is then engaged with the spur gear 135 located on the fixed side and the cover 80 seals these spur gears of the drive transmitting mechanism 30. The mirror housing 10 is pressed against the base 20, using the springs 61, 62, clips 65, 66 and washers 63, 64 which form the buffer mechanism 60.

Figure 21:
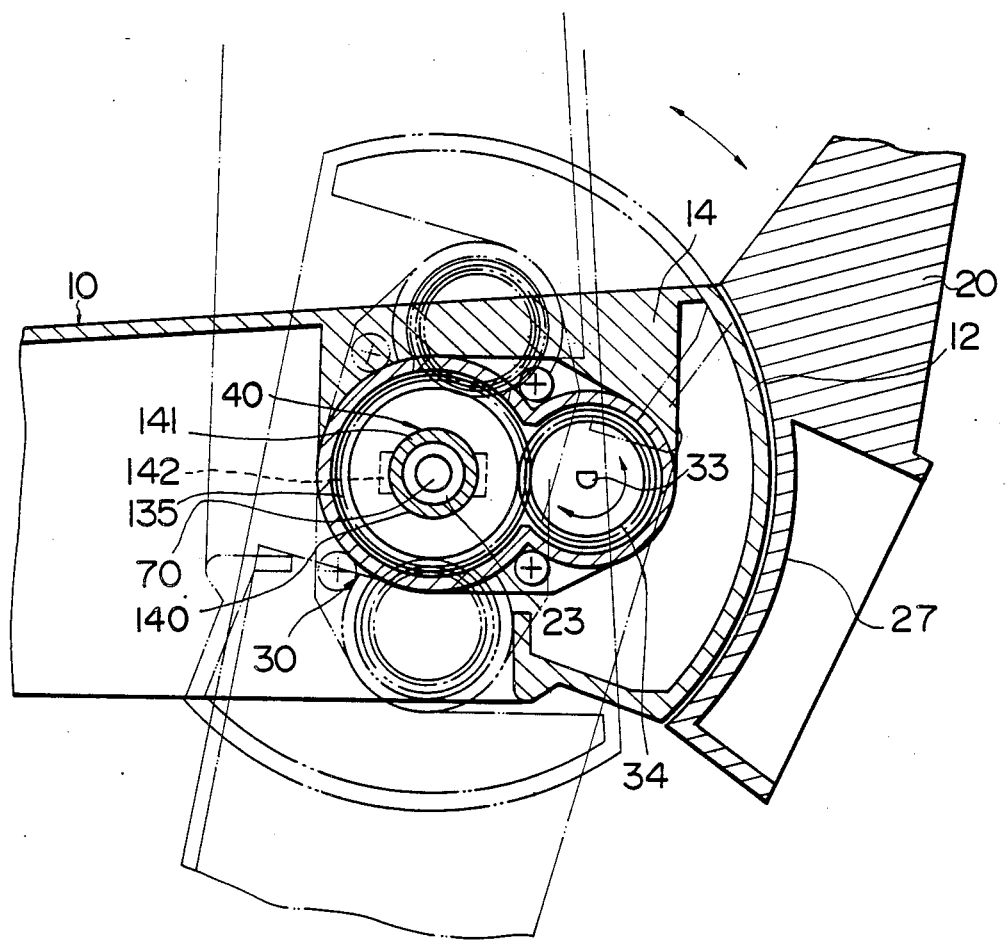

Referring to FIG. 21, it will be described how the mirror housing 10 is swung by remote operation.

In a case where the mirror housing 10 is swung backward, for example, the drive motor 31 is rotated, and its rotation is reduced by the speed reducer 32 and transmitted to the spur gear 34. Since the spur gear 34 is engaged with the spur gear 135 located on the fixed side, the rotation is transmitted to the spur gear 135 to rotate it, but the spur gear 135 located on the fixed side is slide-contacted with the tapered face between the recess 36 and the slide-contact wall 144 on the cylindrical shaft 141 and compressive force is applied to the tapered slide contact face by means of the springs 61 and 62, thereby keeping the spur gear 135 not rotated. Therefore, the spur gear 34 moves round the spur gear 135 and on its axis, and the mirror housing 10 is thus swung backward.

In a case where the mirror housing 10 is swung forward, the drive motor 31 is reversely rotated to reversely rotate the spur gear 34.

Figure 22:
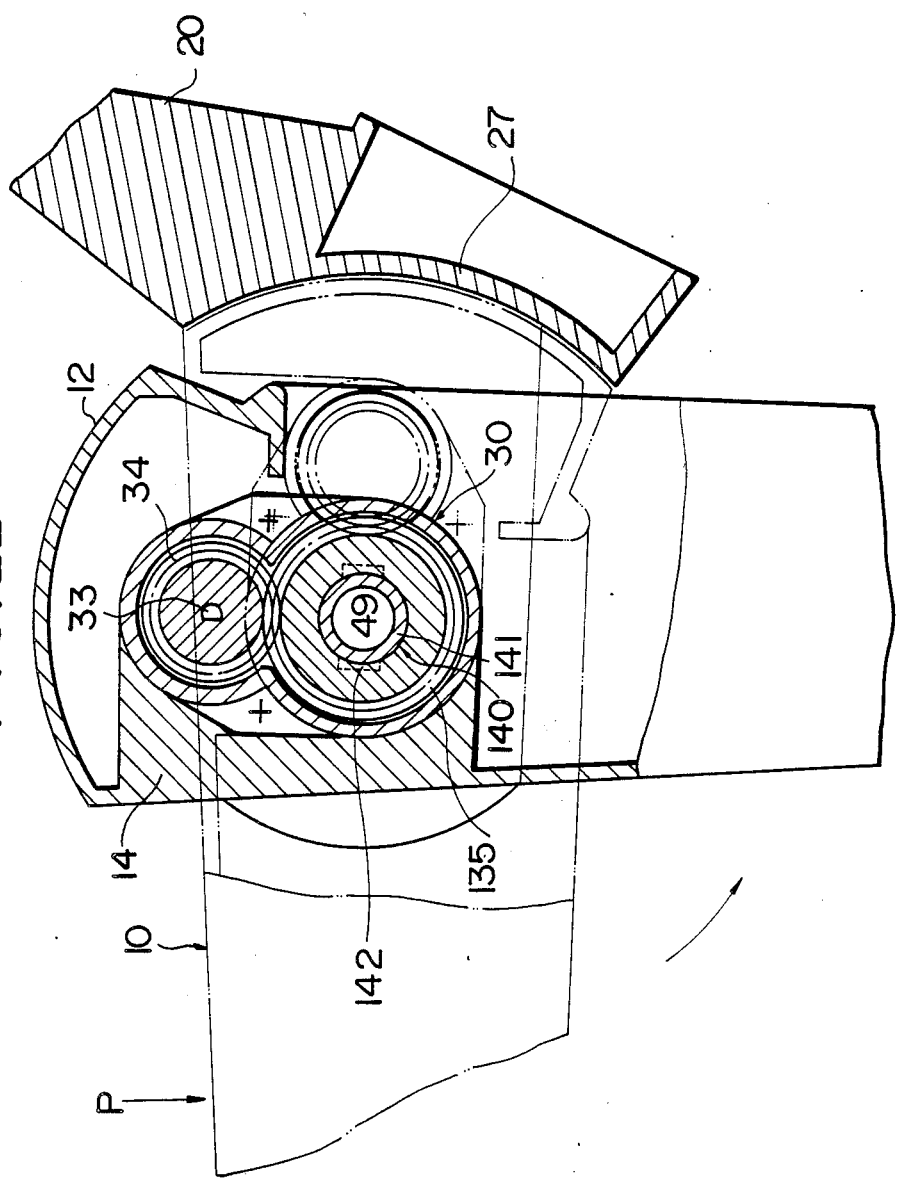

FIG. 22 shows a state under which the mirror housing 10 is swung backward by external force P added thereto from front.

When the external force P is applied to the mirror housing 10, as shown in FIG. 22, the spur gears 34 and 135 become locked and the mirror housing 10 becomes unrotatable together with the spindle member 140 if the load which is added to the mirror housing 10 is smaller than the certain load. When the impact of the external force P is strong, however, the spur gear 135 is rotated relative to the spindle member 140, exceeding frictional force between the spindle member 140 and the spur gear 135 located on the fixed side. This is because the frictional force between the slide-contact wall 144 on the spindle member 140 and the recess 36 on the spur gear 135 is caused by the springs 61 and 62, because the spindle member 140 cannot rotate but move only up and down since it is engaged with the key grooves 123, and because the spindle member 140 is moved upward and released from its frictional engagement with the spur gear 135 when the external force P is stronger than the urging force of the springs 61 and 62.

Figure 23:
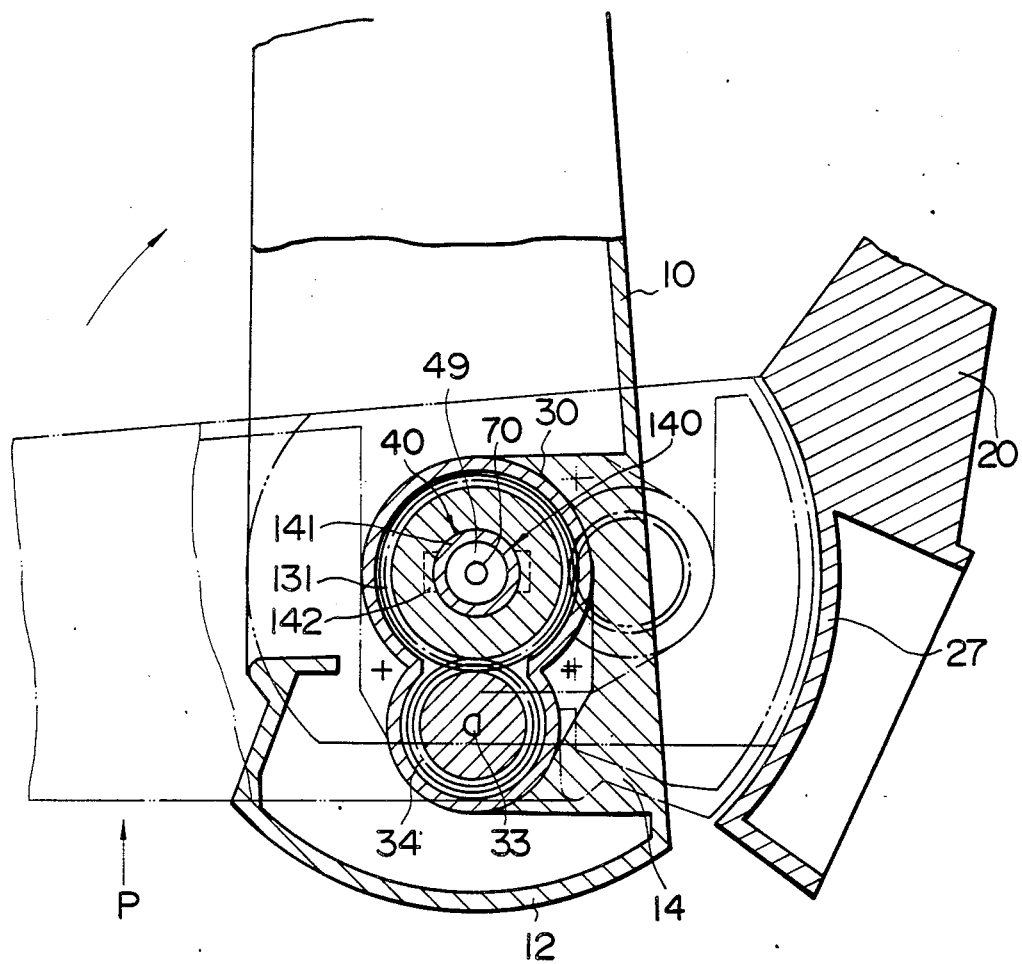

FIG. 23 shows a state under which the mirror housing 10 is swung forward by the external force P added thereto from back. As seen in FIG. 22, the mirror housing 10 is swung forward in relation to the spindle member 140 by the rotation of the spur gear 135 located on the fixed side, thereby buffering the impact of the external force P.

When the mirror housing 10 is swung to its final position in relation to the base and the rotation force of the drive motor is still added to the spur gear 135 located on the fixed side in the case of this second embodiment, the frictional engagement between the slide contact wall 144 of spindle member 140 and the spur gear 135 located on the fixed side is released, as shown in FIGS. 22 and 23, thereby preventing excessive load from being added to the drive motor 31.

In the case of this second embodiment arranged as described above, excessive load can be prevented from being added to the drive motor, in addition to same effects as those attained by the first embodiment.

FIGS. 24 through 29 show a third embodiment of the present invention.

The third embodiment is fundamentally same in arrangement as the first one. Therefore, only parts which are different from those in the first embodiment will be represented by different reference numerals, leaving same parts as those in the first embodiment denoted by same reference numerals.

Figure 24:
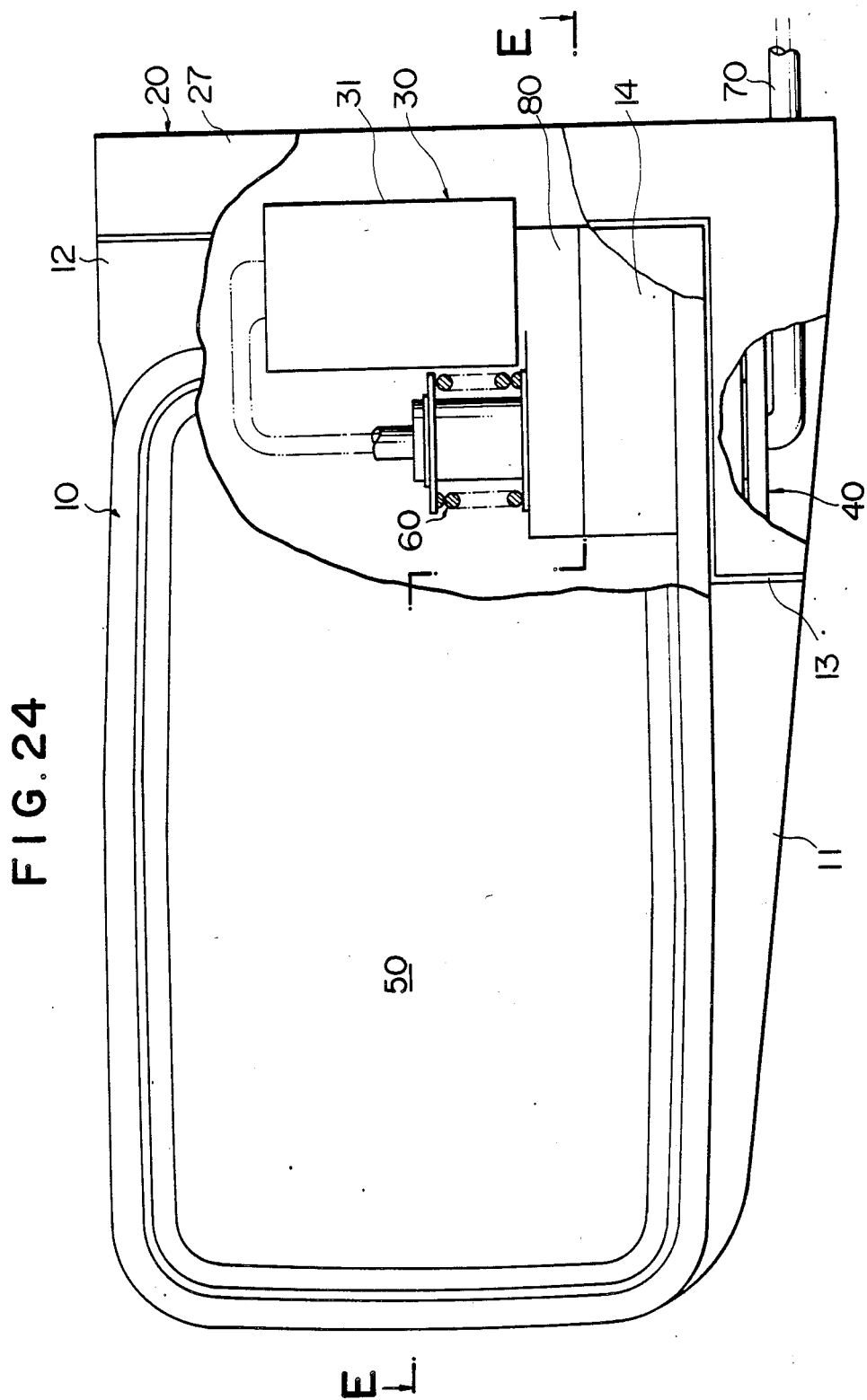
FIGS. 24 through 29 show a third embodiment of the present invention.
Figure 25:
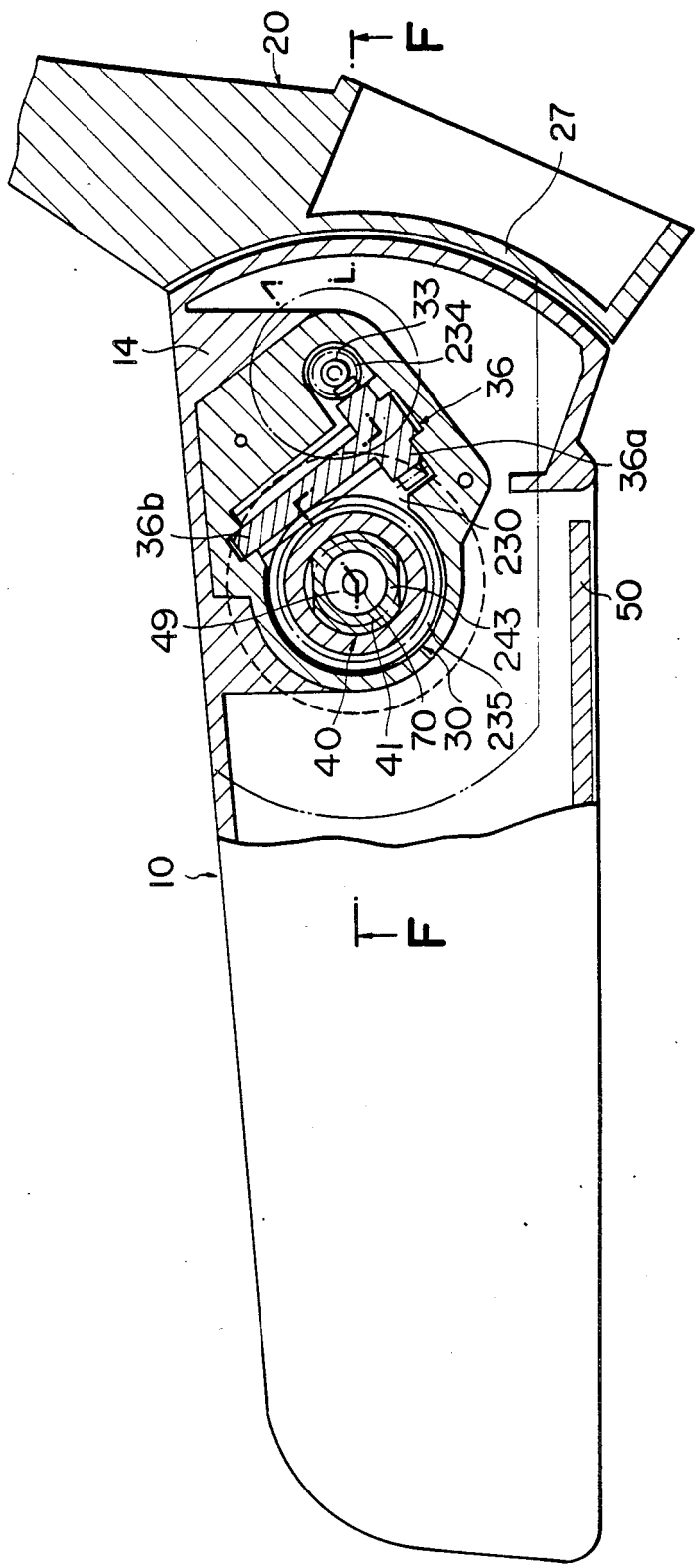
Figure 26:
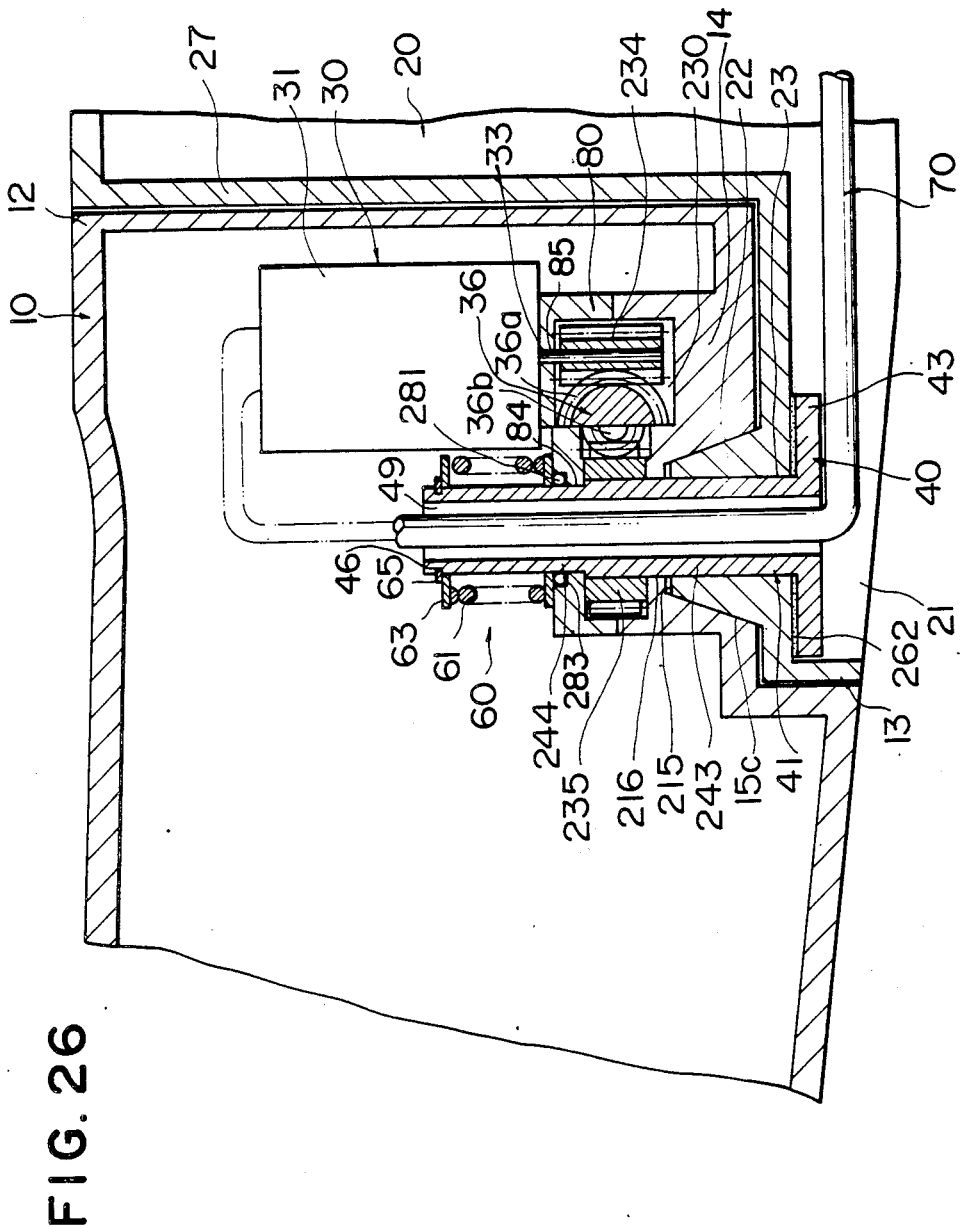

As shown in FIGS. 24 to 26, the base attaching portion 13 which is recessed inward the mirror housing 10 is formed on the base side of the bottom wall of the mirror housing 10. The side wall 12 of the mirror housing 10 is arranged to have a curve portion. The mount 14 which is projected inward from the mirror housing 10 is formed at the base attaching portion 13 of the mirror housing 10. A recess 230 and another recess are formed in the mount 14 and the drive transmitting mechanism 30 is housed in the recess 230. Another recess 215 has the tapered circumferential wall 15c which is encarged below the base. A through-hole 216 is passed through in the recesses 215 and 230 and the cylindrical shaft 41 of the spindle member 40 is passed through the through-hole 216.

The base 20 has the curved vertical wall 27 which corresponds to the side wall 12 of the mirror housing 10, and it also has the support 21 horizontally extending from the vertical wall 27 to the side of the mirror housing 10. The conical bearing 22 is projected from the support 21. The cylindrical shaft 41 of the spindle member 40 is passed through a through-hole 23 which is formed in the center of the bearing 22.

Figure 27:
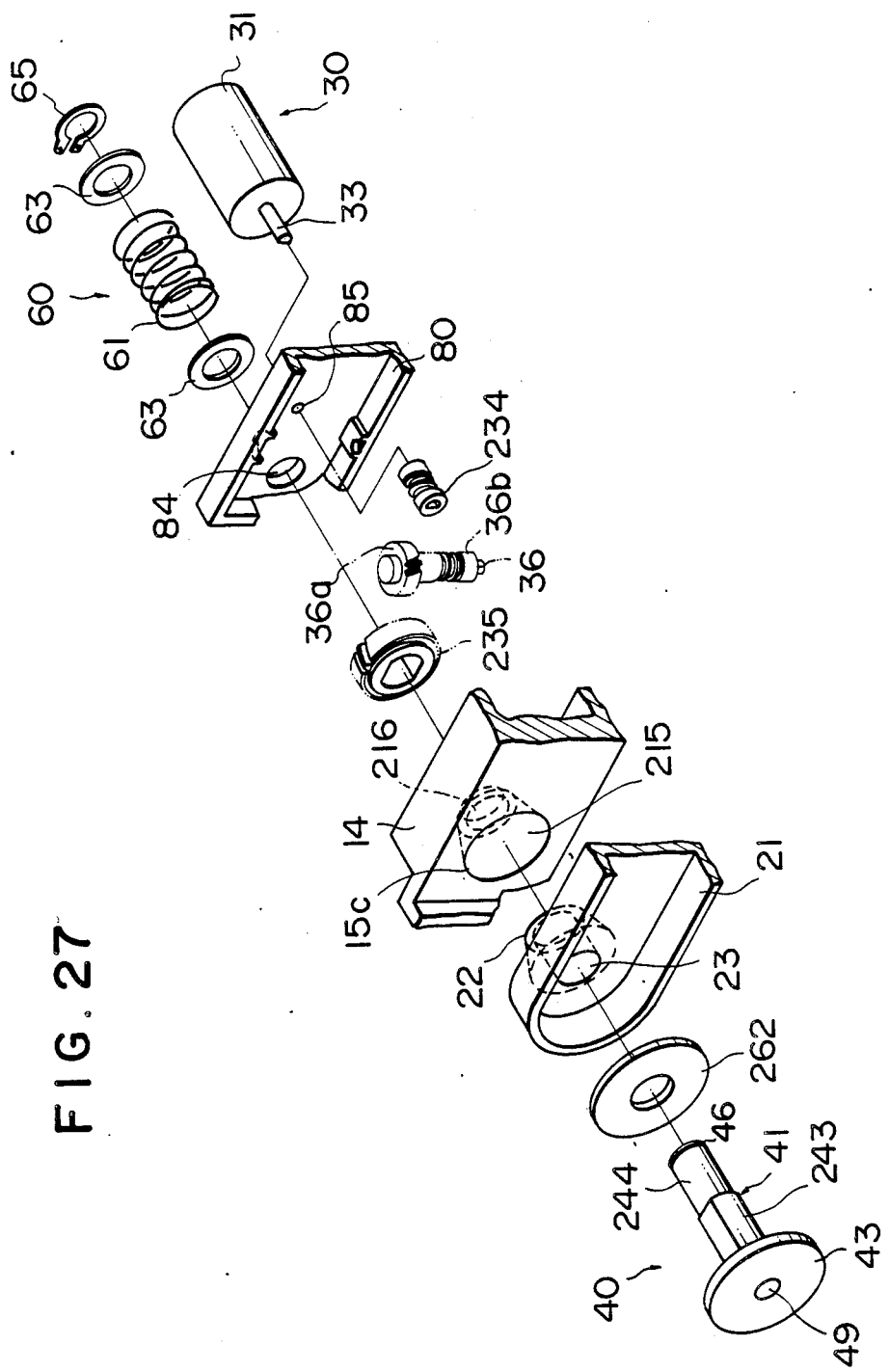

As shown in FIG. 27, the spindle member 40 is provided with the cylindrical shaft 41 and the flange 43 formed at the lower end of the cylindrical shaft 41. The cylindrical shaft 41 includes a large-diameter portion 243 formed on the side of the flange 43, starting from the center thereof, and a small diameter portion 244 formed on the upper side. The hollow portion 49 is formed in the cylindrical shaft 41 and the cord 70 is passed through the hollow portion 49.

As shown in FIGS. 25 and 26, the drive transmitting mechanism 30 comprises a worm wheel 235 fixed to the large-diameter portion 243 attached to the drive motor 31, and a worm 36 located between the two worm wheels 235 and 234. The worm 36 includes a large diameter worm 36a and a small-diameter worm 36b, and the large diameter worm 36a is engaged with the worm wheel 234 located on the movable side while the small-diameter worm 36b is engaged with the worm wheel 235 located on the fixed side.

The buffer mechanism 60 comprises the spring 61 compressed between the engagement groove 46 at the front end of the small-diameter portion 244 of the cylindrical shaft 41 and the upper face of the cover 80 by means of the two washers 63 and clip 65, and a resistant member 262 located between the flange 43 at the lower end of the large-diameter portion 243 of the cylindrical shaft 41 and the base 20. The resistant member 262 is made of leather or resin plate, for example.

Numeral 281 is a packing for water-proof which is fitted into a groove formed on the cover 80.

The mirror housing, base, drive transmitting mechanism, buffer mechanism and cover are assembled as follows in the case of the third embodiment of the present invention.

As shown in FIG. 26, the cylindrical shaft 41 of the spindle member 40 is passed through the through-hole 23 in the bearing 22 of the base 20. At this time, the resistant member 262 is interposed between the cylindrical shaft 41 and the base 20. The recess 215 of the mirror housing 10 is fitted onto the bearing 22. The cylindrical shaft 41 is passed through the through-hole 216 in the recess 215 into the mirror housing 10 under this state. The worm wheel 235, worm 36 and worm wheel 234 of the drive transmitting mechanism 30 are arranged in the recess 230 on the upper face of the mount 14 in such a way that these worm and worm wheels are engaged with one another. The worm wheel 235 located on the fixed side is fixed this time to the large-diameter portion 243 of the cylindrical shaft 41. The cover 80 is fixed on the mount 14. The cylindrical shaft 41 and motor shaft 33 are passed through the through-holes 84 and 85, respectively, and the drive motor 31 and spring 61 of the buffer mechanism 60 are located on the upper face of the cover this time, similarly to the case of the first embodiment. When a packing 281 is fitted into a groove 283 on the circumference of the cylindrical shaft 41 at the upper face of the mount 14, water-proof effect can be enhanced.

Figure 28:
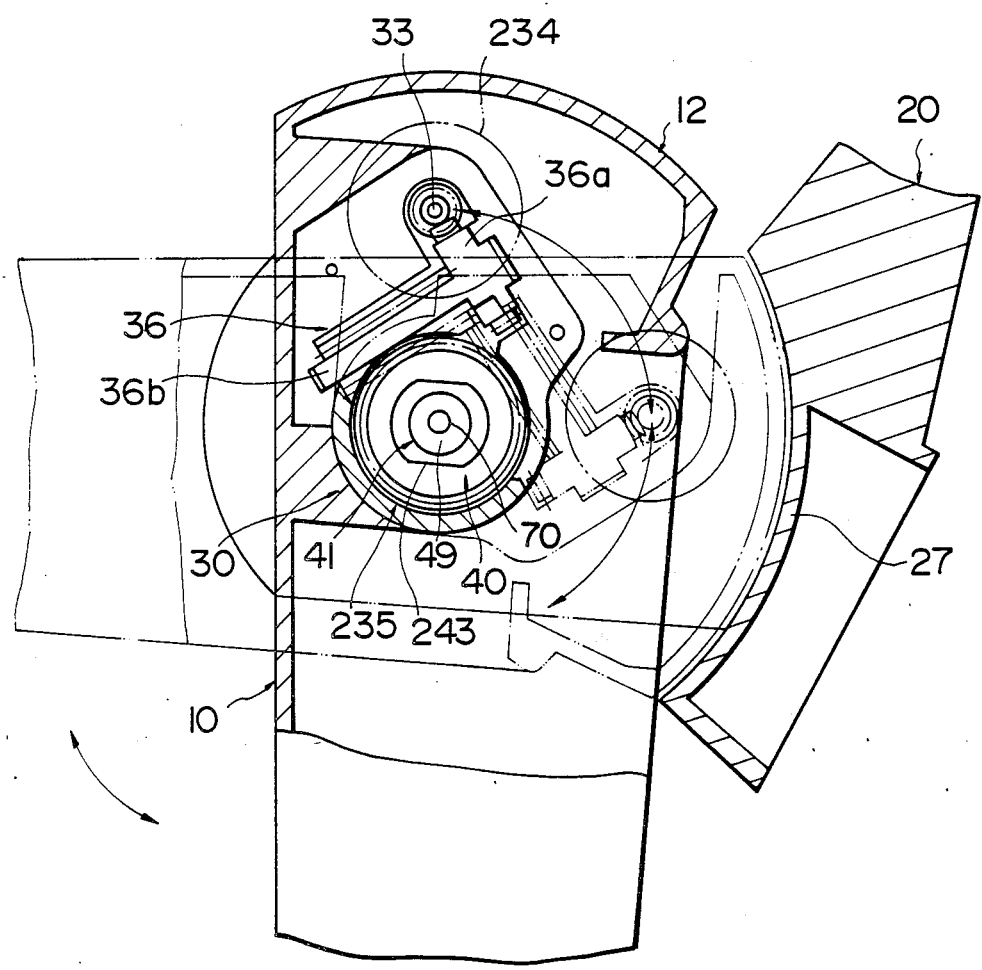

A case where the mirror housing 10 is swung backward by remote operation will be described, referring to FIG. 28.

The drive motor 31 is rotated to transmit its rotation to the worm wheel 234 located on the movable side. The force transmitted is transmitted to the worm wheel 235 on the fixed side through the worm 36. However, the worm wheel 235 is fixed to the spindle member 40 and therefore, it is not rotated. Namely, the mirror housing 10 moves round the cylindrical shaft 41 of the spindle member 40 and on its axis, thereby causing the mirror housing 10 to be swung, sliding on the bearing 22.

Although not shown, it can be easily understood that the mirror housing 10 is swung in the reverse direction or forward when the drive motor 31 is reversely rotated.

Figure 29:
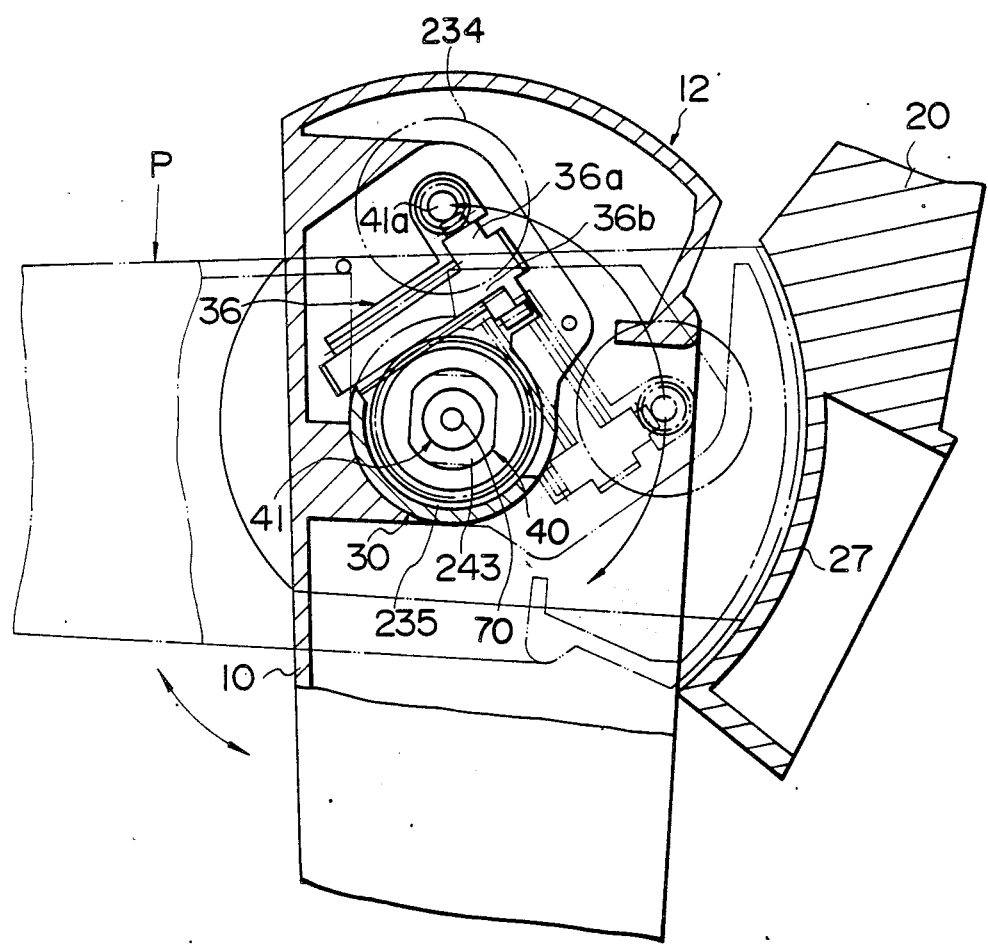
Figure 30:
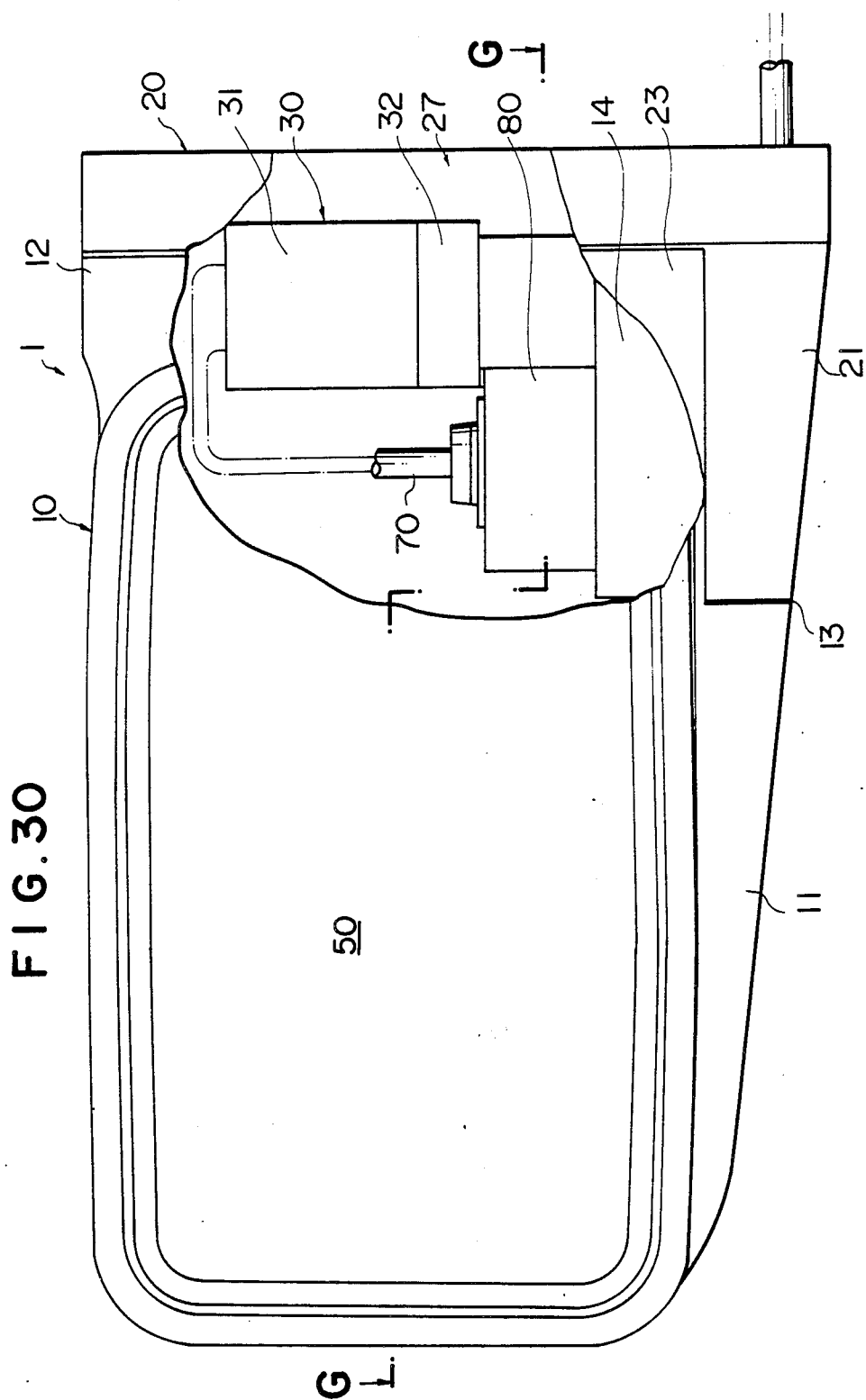
Figure 31:
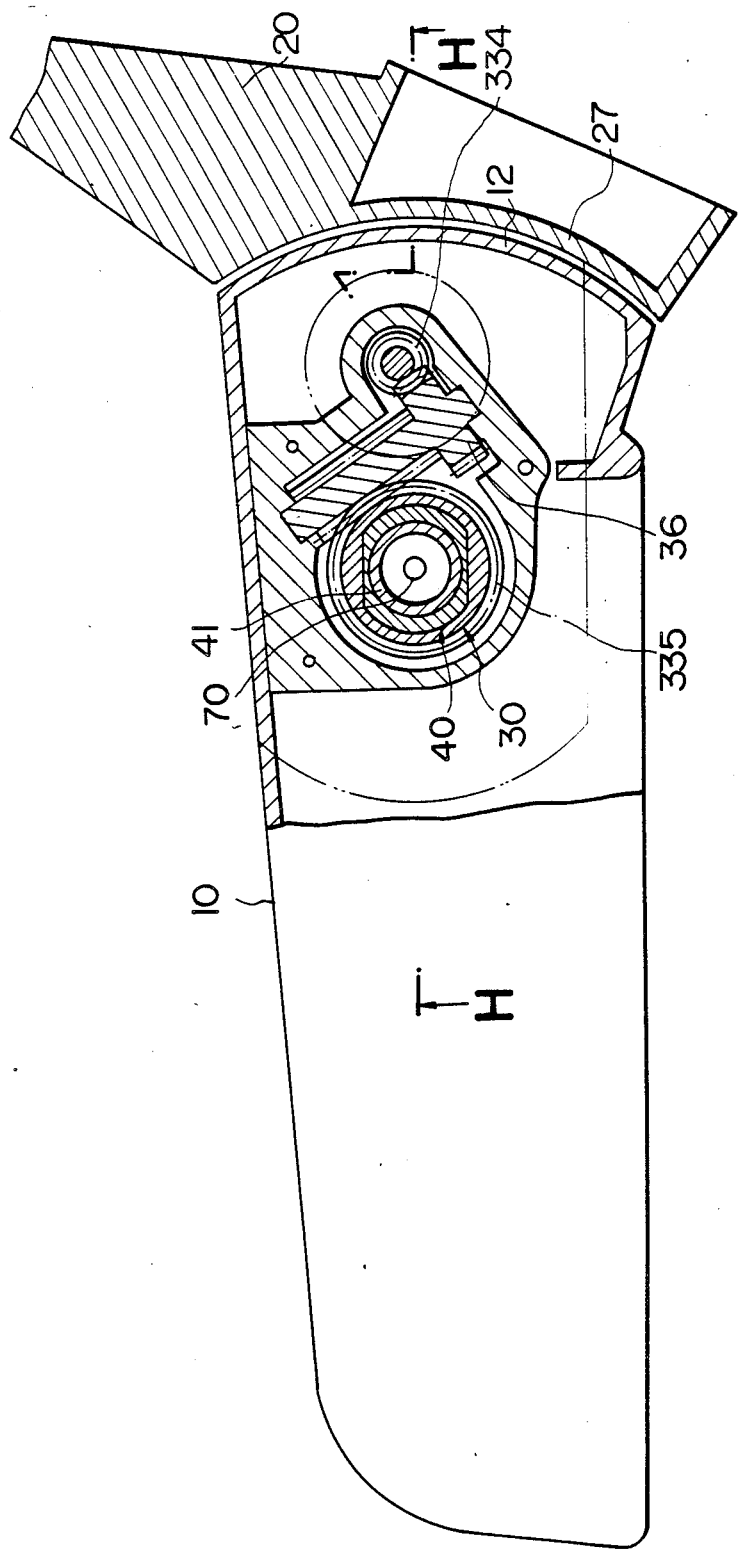

FIG. 29 shows a case where the mirror housing 10 is swung backward by the external force P added thereto from front.

When the external force P is applied to the mirror housing 10 as shown in FIG. 29, the worm wheel 234 located on the movable side, worm 36 and worm wheel 235 located on the fixed side become locked, thereby transmitting the rotation force to both of the worm wheel 235 on the fixed side and of the fixed cylindrical shaft 41, and the mirror housing 10 cannot be rotated relative to the base 20 if the load which is applied to the mirror housing 10 is smaller than the certain one. When the external force P is strong, however, the mirror housing 10 is swung backward together with the spindle member 40, exceeding both of the urging force of the spring 61 between the spindle member 40 and the mirror housing 10 and of the frictional force caused by the resistant member 262. In the case of the third embodiment as described above, the worm wheels 234 and 235 are locked through the worm 36, thereby enabling their locked state to be made extremely strong.

Although not shown, the mirror housing 10 is similarly swung forward when the external force P is added to the mirror housing 10 from back.

FIGS. 30 through 36 show a fourth embodiment of the present invention. This fourth embodiment is fundamentally same in arrangement as the first one but it is characterized in that the buffer mechanism is located inside the cover 80 which serves to seal the drive transmitting mechanism 30.

Therefore, parts which are different from those in the first embodiment will be denoted by different reference numerals and described below, leaving same parts as those in the first embodiment represented by same reference numerals.

As shown in FIGS. 30 to 34, the base attaching portion 13 which is recessed inward the mirror housing 10 is formed on the base side of the bottom wall 11 of the mirror housing 10. The side wall 12 of the mirror housing 10 is provided with a curve portion. The mount 14 which is projected inward the mirror housing 10 is formed at the base attaching portion 13 of the mirror housing 10. The mount 14 is provided with a recess 315 for a bush 400 which is fitted onto the spindle member 40. The through-hole 23 is formed at the bottom of the recess 315. The cylindrical shaft 41 of the spindle member 40 and a cylindrical bearing 401 of the bush 400 the through-hole 23.

A recess 314 for housing the drive transmitting mechanism 30 is formed on the upper face of the mount 14.

The base 20 includes the curved vertical wall 27 which corresponds to the side wall 12 of the mirror housing 10, and the support 21 extending from the vertical wall 27 toward the mirror housing 10. The buffer mechanism attaching portion 24 which has a ring-shaped wall 321 is formed at the support 21. The cylindrical shaft 41 of the spindle member 40 is projected from a bottom 324 of the buffer mechanism attaching portion 24. The cylindrical shaft 41 is provided with the hollow portion 49 formed therein.

The bush 400 comprises the cylindrical bearing 401 fitted onto the cylindrical shaft 41 of the spindle member 40, and a flange 402 at the lower end of the cylindrical bearing 401. A portion 403 is formed on the outer circumference of the cylindrical bearing 401. The worm wheel 335 on the fixed side is attached to the portion 403. The underside of the flange 402 is provided with a recess 404 for a ball bearing 68.

The drive transmitting mechanism 30, similar to the one in the third embodiment, comprises the worm wheel 335 fixed to the bush 400, and the worm wheel 334 attached to the drive motor 31, and these worm wheels are housed in the recess 314 on the upper face of the mount 14 and sealed by the cover 80.

The cover has through-holes 84 and 85 for the cylindrical shaft 41 and motor shaft 33, and a pressing projection 481 on the inner face thereof for pressing the worm wheel 335 on the fixed side.

The buffer mechanism 60 comprises the spring 61 attached to its attaching portion 24 which is recessed on the support 21, a slide member 461 on the spring 61 provided with recesses 463 for the ball bearings 68 on the upper face thereof and moveble only up and down, and a resistant member 462 arranged between the flange 402 of the bush 400 and the bottom of the recess 315. The slide member 461 is limited in rotation because the grooves 465 on its circumferential edge is fitted into a projection 416 on the ring-shaped wall 415 which forms the recess 315.

These mirror housing 10, base 20, drive transmitting mechanism 30, spindle member 40, bush 400 and buffer mechanism 60 are assembled one another as follows.

Figure 32:
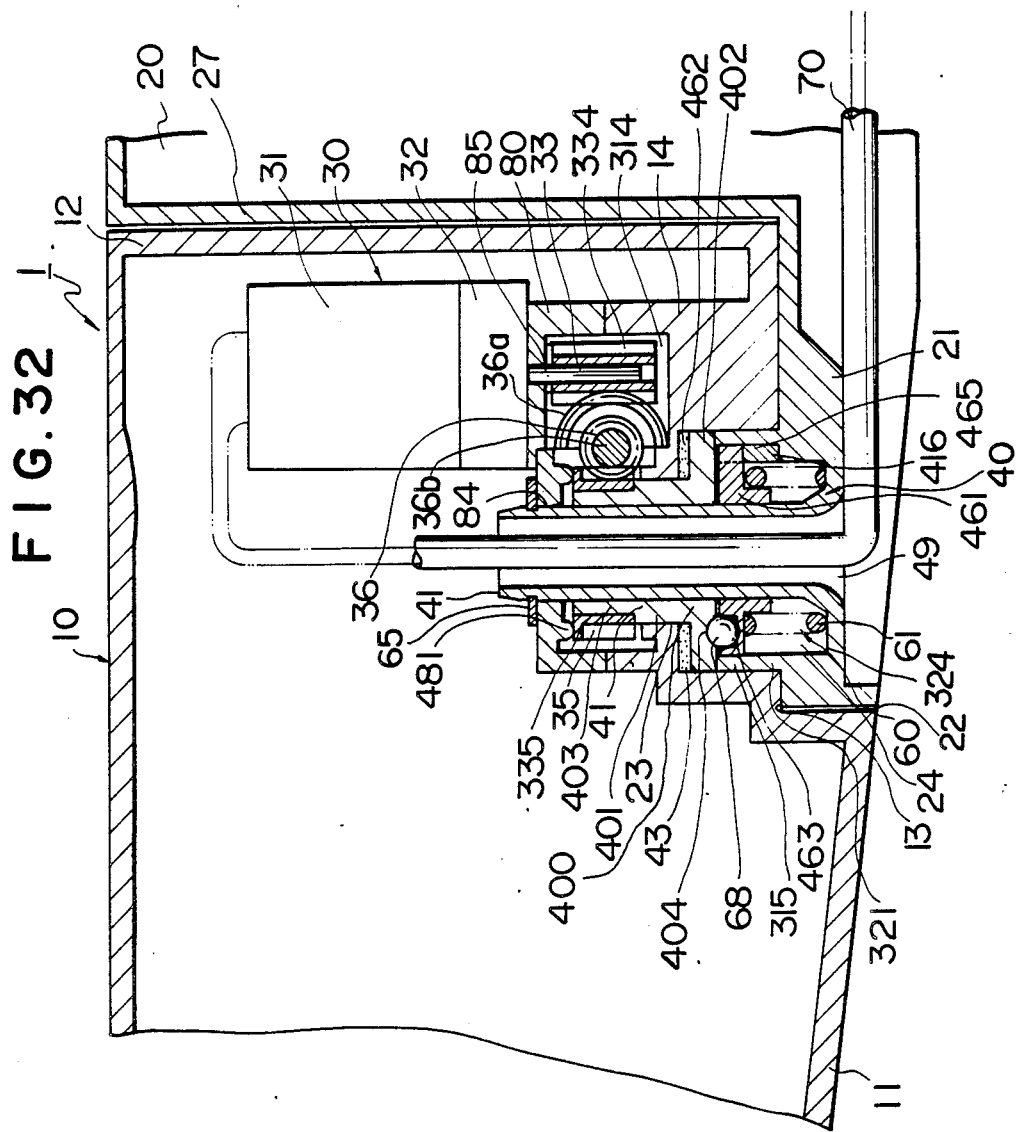

As shown in FIG. 32, the spring 61 is arranged in the attaching portion 24 at the support of the base 20 so as to fit onto the cylindrical shaft 41 of the spindle member 40, and the slide member 461 is located on the spring 61. At this time, the cylindrical shaft 41 is passed through the through-hole 464 of the slide member 461, while the projection 465 on the circumferential edge of the slide member 461 are fitted to projection 416, thereby limiting the rotation of the slide member 461. The ball bearing 68 are arranged in the recesses 463 on the upper face of the slide member 461.

The resistance member 462 is arranged on the flange 402 of the bush 400 which is located onto the ball bearings 68, and the cylindrical shaft 41 is passed through the cylindrical bearing 401 of the bush 400.

The recess 315 of the mirror housing 10 is fitted onto the bush 400, allowing the bush 400 and cylindrical shaft 41 to be passed through the through-hole 23 in the bottom of the recess 315.

The worm wheel 335 on the fixed side is fixed to a portion of the cylindrical bearing 401 which is projected from the recess 314 on the mount 14 of the mirror housing 10. The worm wheel 334 fixed to the motor shaft 33 is engaged with the worm 36, and they are sealed by the cover 80, similarly to the cases of the above-described embodiments. The cover 80 presses the worm wheel 335 by its projections 481 and is fixed to the cylindrical shaft 41 by means of the clip 65.

Figure 35:
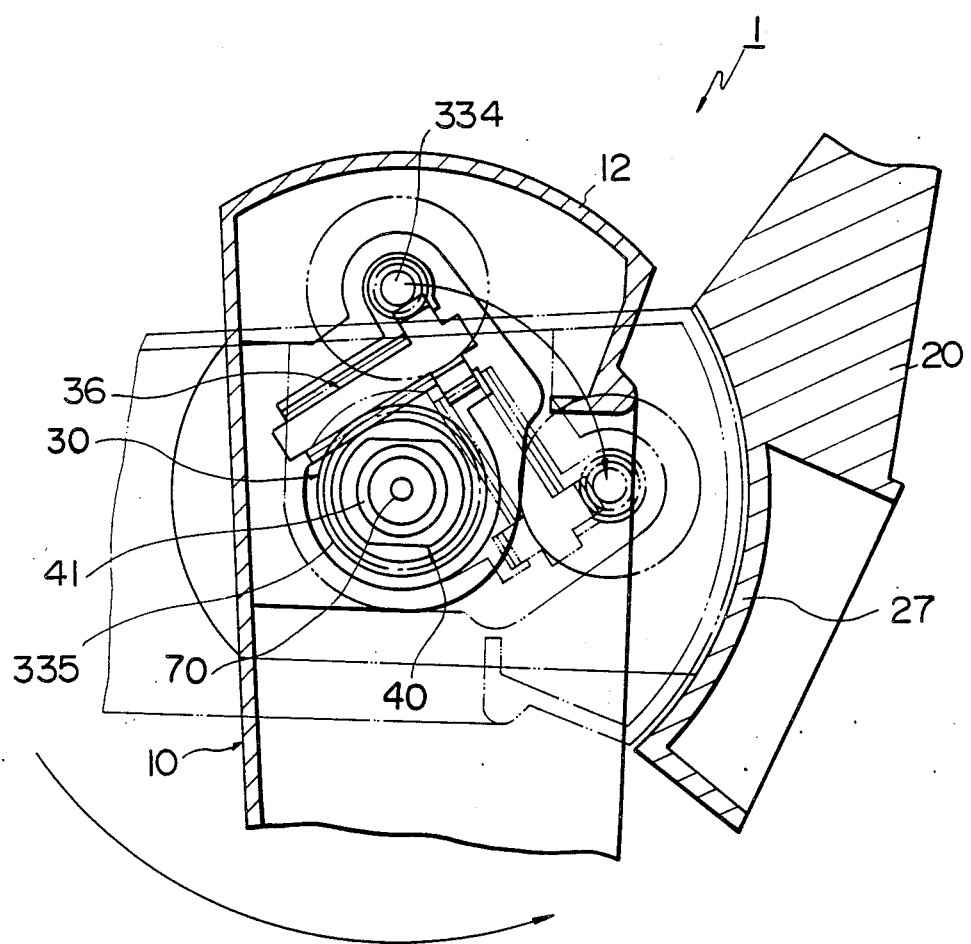

Referring to FIGS. 34 and 35, it will be described how the mirror housing 10 is swung by remote operation.

In a case where the mirror housing 10 is swung backward as shown in FIG. 35, for example, the drive motor 31 is rotated and its rotation is reduced by the speed reducer 32 and transmitted to the worm wheel 334. The rotation force is transmitted to the worm wheel 335 through the worm 36 to rotate the worm wheel 334. However, the worm wheel 335 is fixed to the bush 400, whose rotation is prevented by the compressing force of the spring 61 which is added to the resistant member 462 and ball bearing 68. Therefore, the worm 36 and worm wheel 334 move round the worm wheel 335 and on their axis, respectively, thereby causing the mirror housing 10 to swing round the cylindrical shaft 41.

Figure 36:
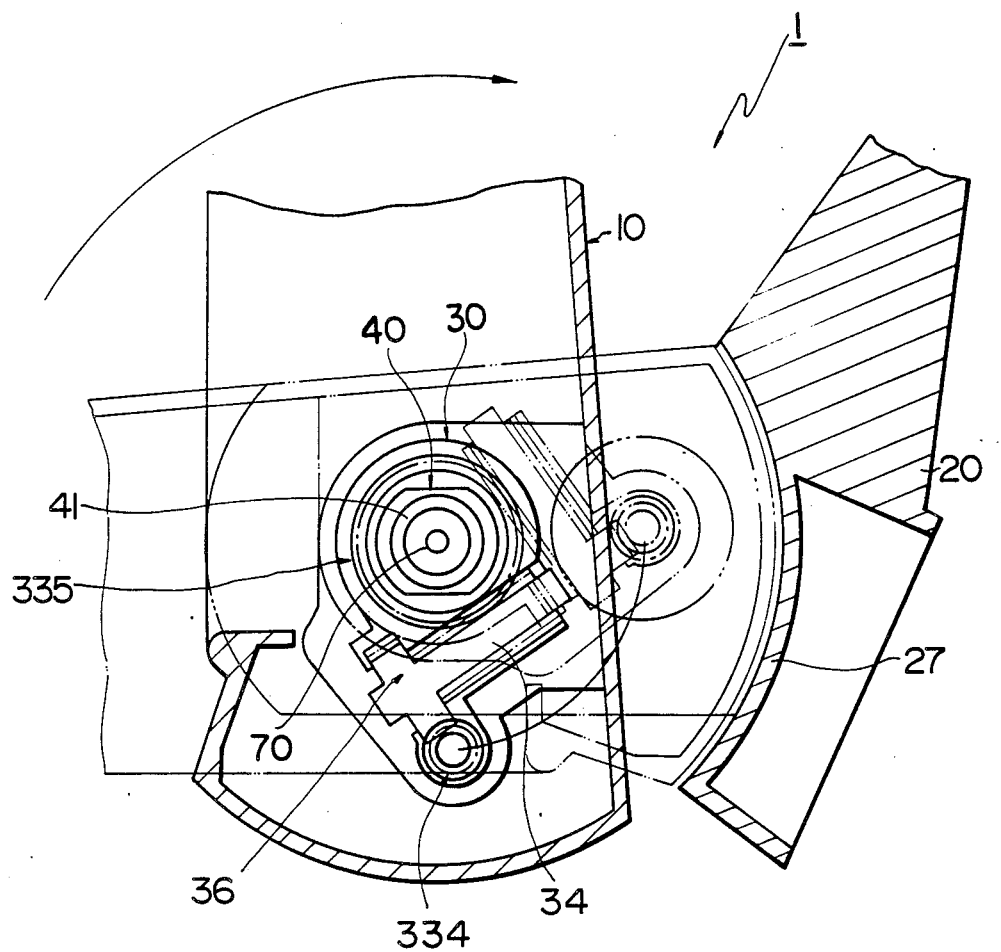

FIG. 36 shows a case where the drive motor 31 is reversely rotated to swing the mirror housing 10 forward.

Figure 37:
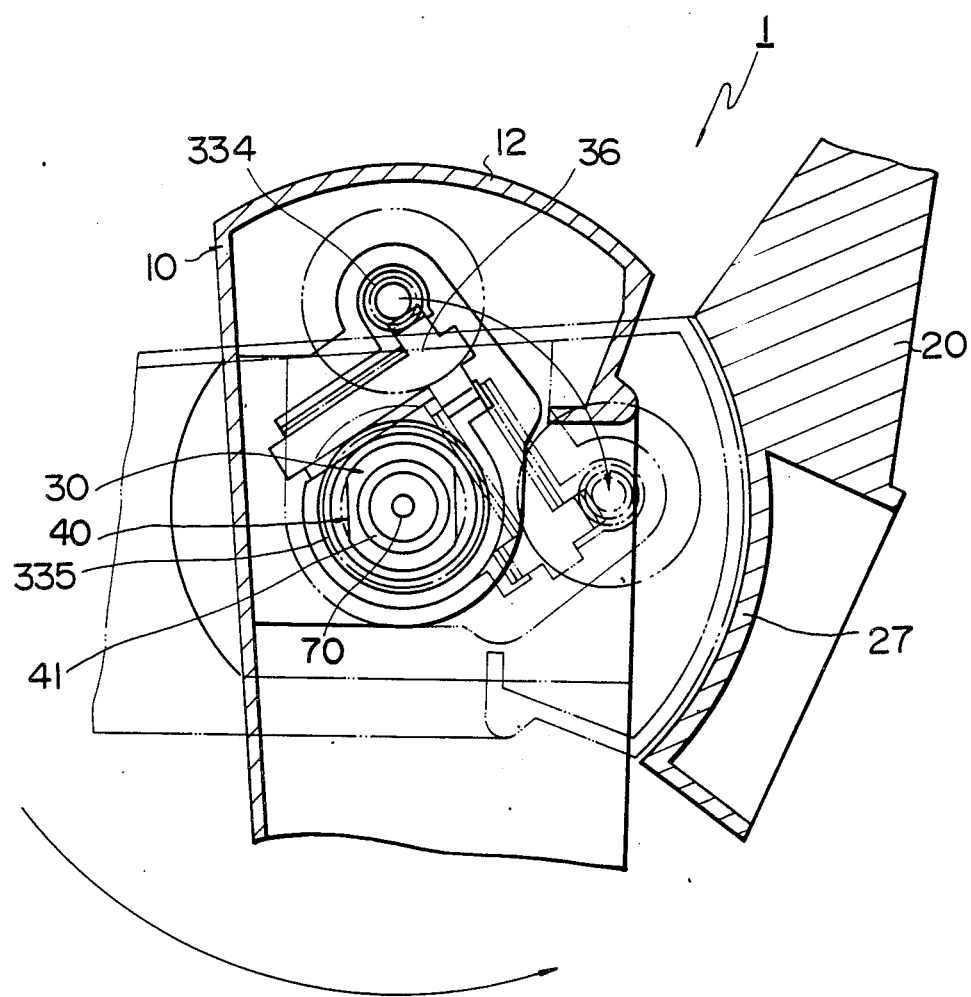

FIG. 37 shows a state under which the mirror housing 10 is swung backward by the external force P added thereto from front.

When the external force P is added to the mirror housing 10 in these cases, the worm wheel 335, worm 36 and worm wheel 334 become locked and both of the mirror housing 10 and bush 400 become unswingable in relation to the cylindrical shaft 41 of the spindle member 40 projected into the recess 24 of the base 20, if the load which is added to the mirror housing 10 is smaller than the certain load. When the impact of the external force P is strong, however, the mirror housing 10 and bush 400 are swung against the compressing force of the spring 61 by separating the ball bearings from either recesses, thereby causing the mirror housing 10 to be swung backward.

Figure 38:
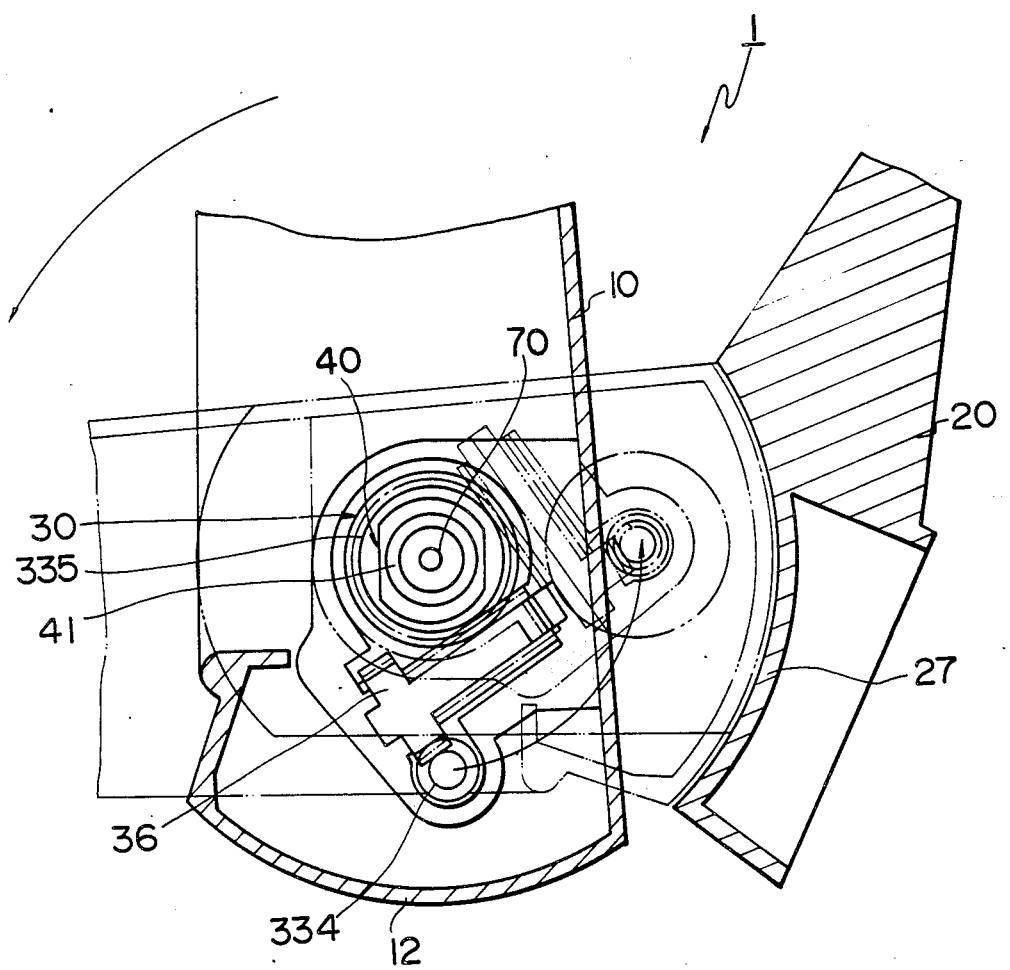

FIG. 38 shows a state under which the mirror housing 10 is swung reverse to the case shown in FIG. 37 by reversely rotating the drive motor 31.

In the case of the fourth embodiment of the present invention, the drive transmitting mechanism 30 and buffer mechanism 60 are sealed to thereby enhance the water-proof effect.

What is claimed is:

1. An outside rear view mirror, comprising:
a base;
a spindle having a longitudinal axis and secured to said base;
a mirror housing provided with a mirror and rotatably secured to said spindle;
a drive motor attached to said mirror housing and communicating with a power supply; and
gear means for mechanically engaging said drive motor with said spindle, said gear means including at least two gears, a first gear of the at least two gears being rigidly secured to an output shaft of said drive motor and a second gear of the at least two gears being secured to said spindle and engageable with said first gear so that rotation of said housing around said axis of said spindle occurs when sdid drive motor is activated by said power supply;
means for absorbing an impact of an external force applied to said mirror housing in a direction non-coincident with said longitudinal axis of said spindle, said absorbing means including means for releasing said spindle for rotation for permitting rotation of said gear means as a unit relative to said base when said external force exceeds a certain predetermined level.

2. An outside rear view mirror according to claim 1 wherein said spindle member is formed integrally to the base.

3. An outside rear view mirror according to claim 1 wherein mechanical engaging means is sealed by a cover.

4. An outside rear view mirror according to claim 1 wherein said gear means is provided with a speed reducer.

5. An outside rear view mirror according to claim 1 wherein said absorbing means includes a buffer mechanism which comprises an elastic member interposed between the spindle member and the cover, and an elastic member interposed between the spindle member and the base.

6. An outside rear view mirror according to claim 3 wherein said absorbing means includes a buffer mechanism which comprises an elastic member interposed between the spindle member and the cover, and a resistant member arranged between the spindle member and the base.

7. An outside rear view mirror according to claim 3 wherein said absorbing means includes a buffer mechanism which comprises an elastic member interposed between the spindle member and the cover, another elastic member interposed between the spindle member and the base, and compressing force applied from the elastic members to the spindle member.

8. An outside rear view mirror according to claim 1, wherein said impact absorbing means includes a bush positioned between said spindle and said mechanical engaging means, said bush remaining stationary relative to said spindle in the absence of an application of external force above said certain predetermined level, and being movable with said gear means when said force exceeds said level.

9. An outside rear view mirror according to claim 8 wherein said buffer mechanism comprises a spring and a slide member interposed between the base and the bush fitted onto the spindle member, and a resistant member arranged between the bush and a mount of the mirror housing.

10. An outside rear view mirror according to claim 1 wherein said buffer mechanism is arranged between the mirror housing and the base.

11. An outside rear view mirror according to claim 1 wherein said spindle member is limited in its rotation round its axis because it is engaged with a key groove in a through-hole of a bearing on the base.

12. An outside rear view mirror according to claim 1, wherein said absorbing means includes means for sliding said second gear relative to said spindle when said external force exceeds said certain predetermined level, said second gear remaining stationary with respect to said spindle during application of said external force at levels less than said certain predetermined level.

13. An outside rear view mirror according to claim 1, wherein said drive motor is movable with said mirror housing along a path non-coincident with said longitudinal axis of said spindle.

14. An outside rear view mirror according to claim 1, wherein said mechanical engaging means includes a rotatable shaft secured to said drive motor, and wherein said rotatable shaft is non-aligned with said longitudinal axis of said spindle.

15. An outside rear view mirror according to claim 1, wherein said inpact absorbing means includes means for decreasing the level of said external force needed to rotate said spindle and said mirror housing to a level below said certain predetermined level, once said certain perdetermined level of external force has been applied to said mirror housing.

16. An outside rear view mirror according to claim 1, wherein said gear means includes a plurality of gears.

17. An outside rear view mirror according to claim 16, wherein said plurality of gears includes at least two worm wheels and a worm, a first said worm wheel being mounted to said spindle member and a second worm wheel being mounted to a rotatable shaft of said drive motor, said worm being mounted to said mirror housing and engaged with said first and second worm wheels.

18. An outside rear view mirror according to claim 16, wherein said plurality of gears consists of spur gears.

19. An outside rear view mirror according to claim 1, wherein said impact absorbing means includes said spindle mounted on a bearing of said base and contacting a mount of said mirror housing, wherein said spindle slides relative to said mirror housing mount during activation of said drive motor, and wherein said spindle slides relative to said bearing of said base when said certain predetermined force is applied to said mirror housing.

20. An outside rear view mirror comprising:
a base portion;
a spoindle having a longitudinal axis and secured to said base;
a mirror housing provided with a mirror and rotatably secured to said spindle;
a drive motor attached to said mirror housing and communicating with a power supply, wherein said spindle member includes a hollow, and wherein a cord which is connected to the drive motor is connected to an operation mechanism through said hollow; and
means attached to said spindle and said drive motor for mechanically engaging said drive motor with said spindle for moving said mirror housing relative to said base portion through rotation of said housing around said axis of said spindle when said drive motor is activated by sdid power supply;
means for absorbing the impact of an external force applied to said mirror housing in a direction non-coincident with said longitudinal axis of said spindle, said absorbing means including means for permitting rotation of said mechanical engaging means as a unit relative to said base when said external force exceeds a certain predetermined level.

* * * * *